(12) United States Patent
Salib

(10) Patent No.: US 11,448,544 B2
(45) Date of Patent: Sep. 20, 2022

(54) SYSTEMS, METHODS AND APPARATUS FOR MONITORING CONDITIONS OF PHYSICAL OR VIRTUAL OBJECTS

(71) Applicant: James Madison Innovations, Inc., Harrisonburg, VA (US)

(72) Inventor: Emil Habib Salib, Harrisonburg, VA (US)

(73) Assignee: James Madison Innovations, Inc., Harrisonburg, VA (US)

(*) Notice: Subject to any disclaimer, the term of this patent is extended or adjusted under 35 U.S.C. 154(b) by 224 days.

(21) Appl. No.: 16/904,304

(22) Filed: Jun. 17, 2020

(65) Prior Publication Data

US 2020/0400483 A1    Dec. 24, 2020

Related U.S. Application Data

(60) Provisional application No. 62/862,880, filed on Jun. 18, 2019.

(51) Int. Cl.
| | |
|---|---|
| G01F 23/68 | (2006.01) |
| G01F 23/22 | (2006.01) |
| G01F 15/06 | (2022.01) |
| G01F 15/063 | (2022.01) |

(52) U.S. Cl.
CPC .......... *G01F 23/68* (2013.01); *G01F 15/063* (2013.01); *G01F 23/22* (2013.01)

(58) Field of Classification Search
CPC ......... G01F 23/68; G01F 15/063; G01F 23/22
See application file for complete search history.

(56) References Cited

U.S. PATENT DOCUMENTS

| | | | | |
|---|---|---|---|---|
| 7,937,215 | B2* | 5/2011 | Humphrey | G06Q 10/08355 701/123 |
| 10,186,120 | B2 | 1/2019 | Farrell et al. | |
| 2007/0013547 | A1* | 1/2007 | Boaz | H04Q 9/00 340/870.02 |
| 2008/0048883 | A1* | 2/2008 | Boaz | H04Q 9/00 340/870.02 |
| 2009/0256686 | A1* | 10/2009 | Abbot | G01R 22/063 340/12.32 |
| 2010/0241277 | A1* | 9/2010 | Humphrey | G01F 23/38 700/282 |
| 2017/0345282 | A1 | 11/2017 | Farrell et al. | |

* cited by examiner

*Primary Examiner* — Sisay Yacob
(74) *Attorney, Agent, or Firm* — Leveque IP Law, P.C.

(57) ABSTRACT

A system, method and apparatus for providing real-time alerts regarding the status of agricultural infrastructure resources, which may be stationary and/or mobile, such as water level, water temperature, trough, water pump, drone, and livestock that are equipped with sensors. The system adaptively aggregates and processes the sensed data from multiple resources and animals using low cost readily available wireless local network and sends an alert cost effectively using various messaging methods, such as SMS, MMS, PSTN, VoIP, HTTP, and HTTPS, over various wireless communications networks, such as cellular, satellite, or UHF, depending on availability, cost and quality of service.

13 Claims, 14 Drawing Sheets

Pump House

SYSTEMS, METHODS AND APPARATUS FOR MONITORING CONDITIONS OF PHYSICAL OR VIRTUAL OBJECTS

FIELD OF THE DISCLOSURE

The present disclosure relates to adaptively monitoring, collecting and analyzing sensed data generated by sensors located on stationary and mobile physical and/or virtual objects over optimized and secure communications channels. Alerts and/or notifications based on the adaptive processing of sensor data and/or aggregated sensor data are generated and communicated securely and wirelessly. Actuators are used to control physical and/or virtual objects.

BACKGROUND

Today, society is faced with a wide range of environmental problems that are continuing to grow in severity. If left unchecked these problems can lead to long term damage to not only the environment but also to the living beings in the environment. To tackle these problems, it is the responsibility of humans to develop a plan to reduce the severity of environmental problems. One such plan includes an initiative the United States Department of Agriculture developed to encourage farmers to cutoff their lands from adjacent streams and waterways. By doing this, runoff from these farms does not flow into the waterway and contaminate watersheds. In return for fencing off their lands the Department of Agriculture provides, at least in the short term, financial assistance to these farmers in order to help the farmers return to normal operating functions of their farm.

BRIEF DESCRIPTION OF THE DRAWINGS

The accompanying drawings, which are incorporated in and constitute a part of this specification, illustrate embodiments of the present disclosure and, together with a general description given above, and the detailed description given below, serve to explain the principles of the present disclosure.

Figure 1:
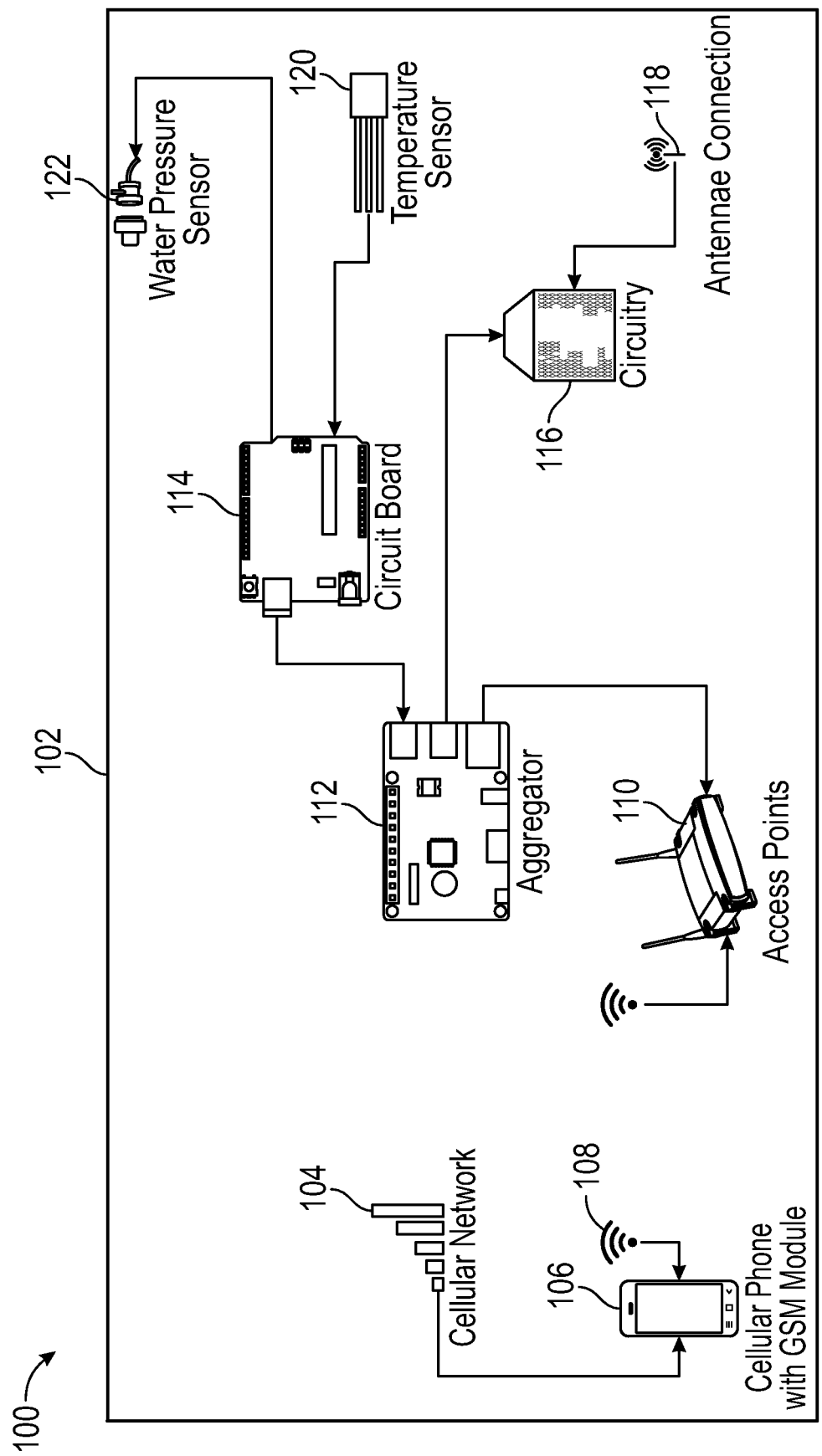
FIG. 1 shows an embodiment that includes a pump house and two water troughs.
Figure 1:
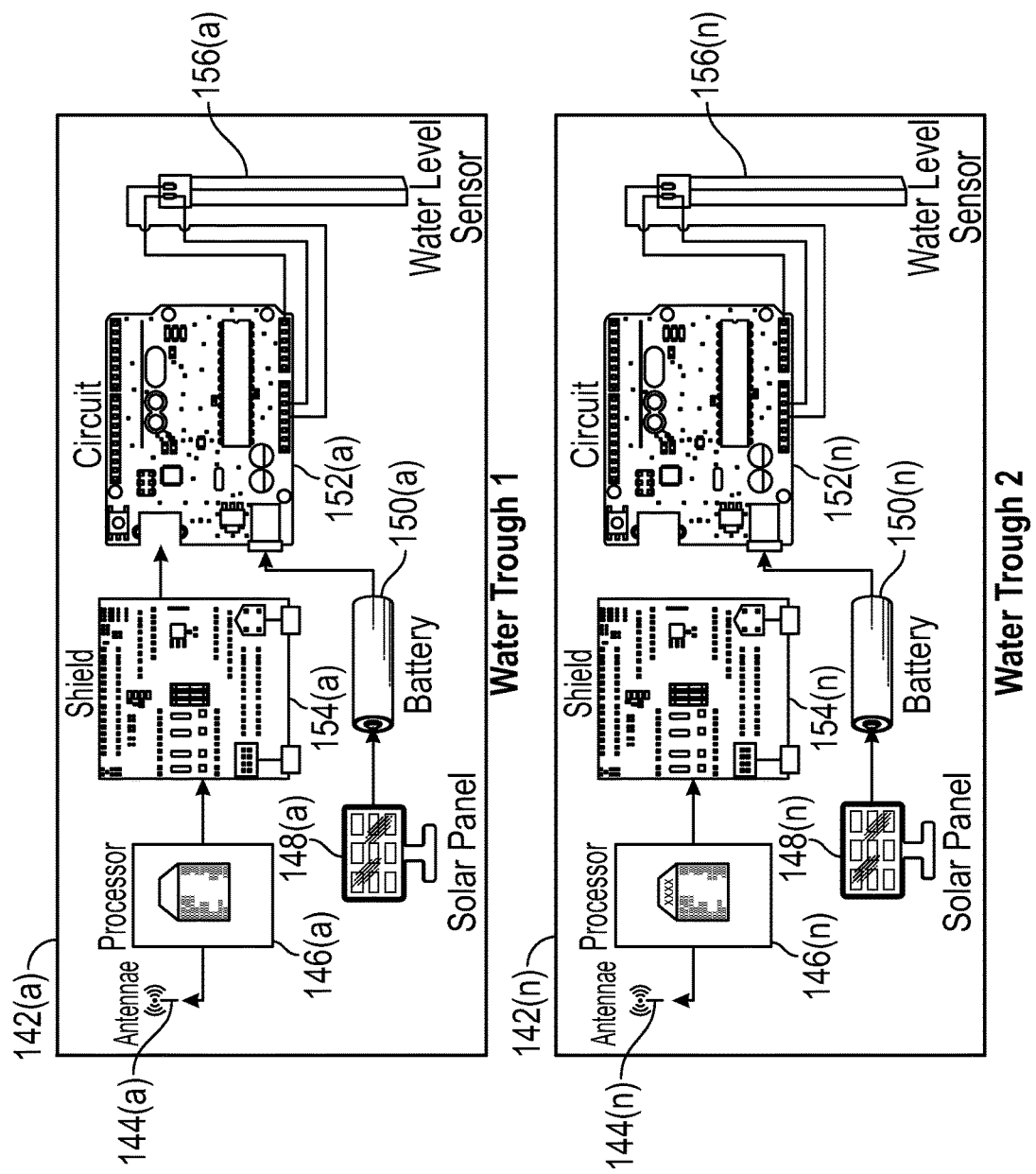

It should be understood that the appended drawings are not necessarily to scale, presenting a somewhat simplified representation of various features illustrative of the basic principles of the disclosure. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The present disclosure will now be described more fully hereinafter with reference to the accompanying drawings, in which example embodiments are shown. This disclosure may, however, be embodied in many different forms and should not be construed as limited to the embodiments set forth herein. Rather, these embodiments are provided so that this disclosure will be thorough and complete, and will fully convey the scope to those skilled in the art.

Embodiments described herein are directed to systems, methods and apparatus for providing real-time alerts and/or notifications regarding the status of agricultural infrastructure resources such as water level, water temperature, trough, water pump, and livestock that are equipped with sensors. The system aggregates and processes the sensed data from multiple fixed and mobile resources and animals using adaptive wireless network and sends adaptively and automatically alert or alerts cost effectively using various messaging methods, such as SMS, MMS, phone call, SS7 signaling, SIP Signaling, VoIP call, HTTP, and HTTPS, over various wireless communications networks, such as cellular, satellite, or UHF, depending on availability, cost and quality of service. Availability encompasses many different embodiments, such as typical operating conditions as well as changes due to malicious interference or exploitation, or other condition(s).

One embodiment is an apparatus that comprises one or more objects; an object is a fixed or mobile physical or virtual article that is equipped with one or more sensors and/or one or more control actuators; one or more objects are grouped to form one or more adaptive basic entity units; one or more adaptive basic entity units are grouped along with an adaptive basic cluster gateway to form one or more adaptive basic clusters; an adaptive basic cluster gateway receives data from one or more adaptive basic entity units through secure wireless channels and is capable of sending alerts and notification as well as receiving control data through a cellular and/or satellite wireless communications connections; one or more basic cluster gateways are adapted to act as adaptive sub-cluster entity units and grouped, along with their served adaptive basic entity units, into one or more adaptive clusters or adaptive higher order clusters.

Each adaptive cluster or adaptive higher order cluster serves one or more adaptive sub-cluster entity using one or more adaptive cluster or adaptive higher order cluster gateways through the use of low rate wireless; each adaptive cluster or adaptive higher order gateway sends alerts and/or notifications as well as receives control data through the use of a cellular and/or satellite wireless communications connections.

As described herein, some embodiments are directed to systems, methods and apparatus for providing real-time alerts regarding the status of agricultural infrastructure resources, which may be stationary and/or mobile such as water level, water temperature, trough, water pump, drone, and livestock that are equipped with sensors. The system adaptively aggregates and processes the sensed data from multiple resources and animals using low cost readily available wireless local network and sends an alert cost effectively using various messaging methods, such as SMS, MMS, PSTN, VoIP, HTTP, and HTTPS, over various wireless communications networks, such as cellular, satellite, or UHF, depending on availability, cost and quality of service.

Those of ordinary skill in the art realize that the following descriptions of the embodiments of the present disclosure are illustrative and are not intended to be limiting in any way. Other embodiments will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the disclosure. Accordingly, the following embodiments are set forth without any loss of generality to, and without imposing limitations upon, the claims.

In this detailed description, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present disclosure.

Furthermore, in this detailed description, a person skilled in the art should note that quantitative qualifying terms such as "generally," "substantially," "mostly," "approximately" and other terms are used, in general, to mean that the referred to item, characteristic, or quality constitutes a majority of the subject of the reference. The meaning of any of these terms is dependent upon the context within which it is used, and the meaning may be expressly modified.

The present disclosure addresses the shortcomings, described in the previous sections, of the current practices in managing agricultural and environmental systems, such as mechanical water systems. The disclosure however is not limited in its applicability to these systems.

Embodiments described herein relate to an improved monitoring system in which enhanced adaptability, availability, adoptability, modifiable, reliability, diversity, scalability and cost effectiveness are achieved through the local data aggregation basic or higher order adaptive cluster comprising multiple adaptive basic entity units or adaptive sub-cluster entities and the adaptive basic cluster or adaptive higher order gateway architecture and hierarchy. Particular embodiments of this disclosure are directed to the capabilities to adaptively aggregate sensor data, generate alerts and notifications, communicate control data/messages in the most diverse, versatile, scale-able, reliable and cost-effective method.

The system is adaptable because the system utilizes information gathered previously or accessed from an electronic storage device or location to respond to changing conditions. Previously acquired information and/or signals related to monitoring are used to generate updated or modified, or adapted signals that are processed to generate alerts or status indicators related to one or more objects, which may be physical objects or virtual objects or a combination of physical and virtual objects.

The system is capable of adjusting parameters and information based, at least in part, on iterative information gathered from one or more sensors that acquire information related to one or more objects that are being monitored. These objects may be physical objects or virtual objects. The parameters and information, which are flexible and adaptable may be used to control and/or monitor physical and/or virtual objects.

Physical objects include items such as feed troughs, water toughs, fences, gates, doors, such as barn doors, which may be in an open state or closed state, and associated characteristics, such as being locked or unlocked, temperature, water level, feed level and similar properties and features of the physical object.

Virtual objects may be representations of physical objects, which may be displayed or provided on a user interface, such as a smart phone screen, touch screen or other electronic device. The virtual objects may correspond to one or more physical objects or may be merely an electronic representation in two-dimensions and/or three-dimensions.

Furthermore, a virtual object may also be a software defined object, that is, a process defined in software that may be the subject of monitoring and/or control. An example is a process that is monitoring the memory or CPU consumption or utilization on a device such as a computer, RPi (Raspberry Pi), Arduino, etc. This may be used in support of detecting over-utilization due to a run-away processes or a software malware that could lead to a device or network becoming unavailable.

One or more objects may be grouped, or combined, to form one or more adaptive basic entity units. One or more adaptive basic entity units may be grouped, or combined, with an adaptive basic cluster gateway to form one or more adaptive basic clusters.

An adaptive basic cluster gateway receives data from one or more adaptive basic entity units through secure wireless channels and is capable of sending alerts and notification as well as receiving control data through a cellular and/or satellite wireless communication connections.

One or more basic cluster gateways are configured to act as adaptive sub-cluster entity units and grouped, along with their served adaptive basic entity units, into one or more adaptive clusters or adaptive higher order clusters. One or more adaptive cluster or adaptive higher order cluster serves one or more adaptive sub-cluster entity using one or more adaptive cluster or adaptive higher order cluster gateways through the use of low rate wireless. One or more adaptive cluster or adaptive higher order gateway sends alerts and/or notifications as well as receives control data through the use of a cellular and/or satellite wireless communications connections.

Indeed, the objects monitored may be a combination of physical and virtual objects. Some physical objects may be items, such as a trough, gate, fence, barn door and similar tangible things. The physical object may include a virtual object representation. The virtual object representation may include images, or electronic data that represents additional information for a physical object.

As farmers embrace environmental stewardship and being encouraged and supported by the United States Department of Agriculture, many farmers plan to improve surface water quality by excluding cattle from areas close to streams and rivers as well as establishing riparian buffers along streams and rivers. This exclusion requires establishment of mechanical watering systems for the cattle, which include but not limited to water troughs, fences, gates, and one or more water pump houses.

Currently, while mechanical water systems may be used to refill water troughs, there are some issues.

First, the amount of water can only be measured by manually inspecting each trough and observing the water level. This inspection may need to be done on a regular basis since the water floats used at the troughs to allow the water refilling are prone to mechanical failures. Second, the mechanical systems are susceptible to failure due to the pump house losing pressure. The loss in pressure may be caused by low temperatures, causing the pipes in the pump house to freeze.

Some farmers have installed cellular cameras, which may include a cellular camera for each trough and a means, or techniques, such as video data streaming, still images, photos, or other output from a cellular camera, of acquiring real time visual inspection of the water trough conditions, such as water level and water freeze. However, in addition of being expensive, the visual images/photos have proven to be unreliable.

Today, a farmer relies on physically inspecting the water troughs and water pump houses along with other articles and objects to make sure that the troughs and pump houses are properly functioning and operating.

It would improve farm productivity by reducing costs for labor and/or time spent on location performing visual and/or physical inspection of the mechanical water system.

Therefore, it would be an improvement to have a monitoring, collection, analyzing, alerting and control system. Such a system should be highly available, adaptable, reliable, meet the diverse needs from small to large farms, versatile, scalable, customizable, real time, and cost effective. It would be desirable, for example, to be able to monitor and report the water level and temperature in the troughs and the water pressure of the water pump and the ambient temperature at the pump houses. These characteristics would be assessed and if any of them exceeds a specific threshold, an alert and/or notification would be transmitted to the appropriate personnel via a mobile device, displayed on a monitoring screen, and/or logged into a database for analysis.

In addition to the ability of the system to send alerts and notification messages to users, systems (websites) and/or databases, it is also capable of displaying the same as additional information layer(s) on a map, which identifies the location of the stationary and mobile monitored and/or controlled objects.

The present disclosure is directed to a system that aggregates and processes sensed data from multiple resources, which may be stationary and/or mobile and animals using highly available and adaptable license-free wireless local network and transmits an alert cost effectively (for multiple resources and animals) using various messaging methods (SMS, MMS, PSTN, VoIP, HTTP, HTTPS, audio and video streaming protocols, etc.) over various wireless communication networks, such as cellular, satellite, etc., depending on availability, cost and other quality of service measures.

This provides efficient, high availability, adaptability, reliability, timely and cost effective techniques (methods and tools) to thereby provide real-time alerts and/or notifications to a farmer and/or user on the health of their farms' agricultural infrastructure resources (such as water troughs, water pumps, fences, gates, etc.) and livestock that are equipped with sensors.

As used herein, a sensor is used to sense a physical quantity, condition or state, such as water temperature, air temperature, soil moisture, pH level, water pressure, images, drone elevation and other conditions. The sensors may be mounted or disposed as desired to accomplish the desired sensing.

As used herein, an object including stationary object(s) or mobile object(s), physical objects or virtual object is an article such as a trough, support post, drone, human, animal, tractor, water tank or other tangible item or article or a representation of an actual article or object. This representation may be a virtual object comprising an electronic representation of a physical object, such as a computer generated image of a thing.

As used herein, a basic entity unit comprises one or more objects and has a low rate highly available and optimized radio transmitter unit. This low rate has a predetermined data transmission rate. The low rate data transfer rate may be between approximately 20 kb/s to approximately 250 kb/s.

The highly available transmitter unit is a transmitter that is readily available for data transfer. The highly available transmitter unit is dedicated to transmission between objects in the system. For example, a highly available transmitter unit is a transmitter in an object, such as a water trough, tractor, feed trough, fence post, etc., that transmits data to a gateway device and/or another object. This data is typically sensed data from a sensor disposed on or proximate to the object. This transmitter device typically does not transmit other data such as broadcast radio programming, public radio or other unrelated data. The object may be fixed in location or mobile.

As used herein, an adaptive basic entity and router unit comprises one or more objects and has low rate radio receiver and transmitter units, which may be fixed in location or mobile.

A basic entity and router unit is an object or basic entity that includes adaptive routing and selection functionality.

As used herein in this disclosure a virtual object may be a software defined object, that is, a process defined in software that may need monitoring or control. An example is a process that is monitoring the memory or CPU consumption or utilization on a device such as a computer, RPi (Raspberry Pi), Arduino, etc. This may be used in support of detecting over-utilization due to a run-away processes or a software malware that could lead to a device or network becomes unavailable.

As used herein low rate highly available is a relative term. Low rate RF devices refers to those devices capable of data transfer rate between approximately 20 kb/s to approximately 250 kb/s.

As used herein, highly available communication network and devices, which are typically part of the network, refer to at least portions of a secure communication network with the ability to defend against security attacks such as denial of service (DoS) and interference ensuring high availability.

An adaptive gateway may be an adaptive basic gateway (sub-gateway) or an adaptive cluster gateway (higher order gateway). An adaptive basic gateway includes objects, low rate wireless radio receiver, and wireless cellular and/or satellite alert functionality; it may be stationary (fixed in location) or mobile.

An adaptive basic cluster may comprise an adaptive cluster gateway which serves one or more adaptive basic entity units.

An adaptive sub-cluster entity unit may be an adaptive basic gateway adapted to have low rate highly available wireless radio receiver and transmitter units; it may be stationary (fixed in location) or mobile.

An adaptive sub-cluster entity may comprise an adaptive sub-cluster entity unit and one or more adaptive basic entity units and/or one or more adaptive basic entity and router units.

An adaptive cluster or higher order cluster gateway may comprise objects, low rate highly available wireless radio receiver and wireless cellular and/or satellite alert functionality. Low rate refers to those devices capable of data transfer rate between 20 kb/s to 250 kb/s.

An adaptive cluster or higher order cluster may comprise one or more adaptive sub-cluster entities.

FIG. 1 shows an embodiment 100 that includes components installed at a pump house 102 and at two water troughs 142(a) . . . (n) (where "n" is any suitable number). Although two water troughs 142(a) and 142(n) are shown, any suitable number of water troughs (generally 142) may be used. In this disclosure, monitored and/or controlled objects or basic entity units could be water tanks, water valves, water troughs, water pumps, water pipes, fences, mechanical devices, electronic devices, drones, tractors, mounted cameras, posts, gates, human beings, creatures, animals, livestock, doors, and general machines.

An object, or adaptive basic entity unit, may be equipped with one or more sensors and/or one or more actuators. The sensors may include sensors that are adapted to sense liquid temperature, liquid pressure, liquid level, ambient temperature, location coordinates, power harvested, battery charge and power consumption. The sensors may be used to sense motion as well as when an object moves from a first position to a second position.

The object may be a physical object as described above or a virtual object. A virtual object may be, for example, a digital representation of an object, an electronic representation of an object, a pixel representation of an object or a voxel representation of an object. For example, a virtual object may be an electronic representation of an actual object, such as a field of crops. A drone may obtain a photograph, image data, streaming video or other form of electronic data of a field of crops, which may be obtained from above the field. The obtained image data may not adequately represent the vertical height of the crops, such as the vertical height of corn plants or other vegetation. However, the obtained image data may be manipulated such that a vertical dimension of the crops is provided to a user. A user may then determine whether the height of the crops warrant harvesting, without actually being present at the field because the virtual generated image provides a graphical or digital representation of the field.

The pump house 102 includes GSM module 106, which may be a cellular phone, operably coupled to a WLAN network 108 and a cellular network 104. The pump house 102 may also include one or more access points 110, data processors, applications, aggregator 112, data processors (with analog or digital capabilities) circuit board 114, ambient temperature sensor 120, water pressure sensor 122 and circuitry 116, such as low rate wireless radio unit, coupled to antenna connection 118. A sensor comprises an article capable of sensing a physical quantity.

Circuit 116 receives data from a basic entity unit 120, 122, which is mounted or positioned to obtain data related to an object (such as water trough). For example, an adaptive basic entity unit may comprise of a water level sensor mounted to an object, such as a water trough. Another example is an adaptive basic entity unit, which includes sensors, mounted on a fence post or a gate.

A source of water, typically a water pump along with a water tank having suitable capacity (not shown) may be used to provide water from the pump house 102 to one or more of the water troughs (generally 142) based on a typical mechanical float switch or the sensed data from the sensors installed at the particular trough 142. Sensed data may also include pH level, water and/or stream flow, soil moisture, soil temperature, animal vital signs, images from a camera, images from a drone, drone elevation and other similar parameters.

In the embodiment shown in FIG. 1, the water trough 142(a) is also shown and the elements are described in general; but apply to any water trough or tank (generally 142). The elements shown in relation to water trough 142(a) also pertain, and are shown in relation to water trough 142(n).

Antenna 144(a) transmits a signal carrying data from the XBEE low rate radio unit circuit 146(a), which is a circuit on XBEE/Arduino shield 154(a) of circuit 152(a). Battery 150(a), which is operatively coupled to solar panel 148(a), provides power to the water level sensor 156(a) as well as processing element 152(a), shield 154(a) and processor 146(a). While water level sensor 156(a) is shown, any other suitable sensor may be used. These sensors may include pressure sensors, temperature sensors, pH sensors, chlorine sensors, contaminate sensors, etc. The sensors (generally 156) can provide data that can trigger an alert and/or control messages to actuators installed on objects or adaptive basic entity units, which may initiate or terminate the flow of water from the pump house 102 to one or more of the water troughs 142(a) . . . (n).

An actuator, as used herein, is an article, or device, or machine, or switch or other mechanism configured or capable of being used to change the state of a physical object. The data from the sensors, generally 156, may also be sent to the pump house circuits or modules that are configured to generate and transmit an alert or notification to a location, such as a smart phone, laptop, user interface, or other desired destination.

For example, if the sensor 156 senses that the water is contaminated, or the pH is out of an acceptable range, an alert signal or message can be transmitted to the appropriate location for the most efficient resolution of the issue. This location may be a person, computer, alarm system, smart phone, user interface, database or other remedial activity module.

All units are configured to serve both stationary and mobile objects and are adaptive in terms of their abilities to determine and select the most available and reliable path to deliver the alert service to the intended users and applications.

Figure 2:
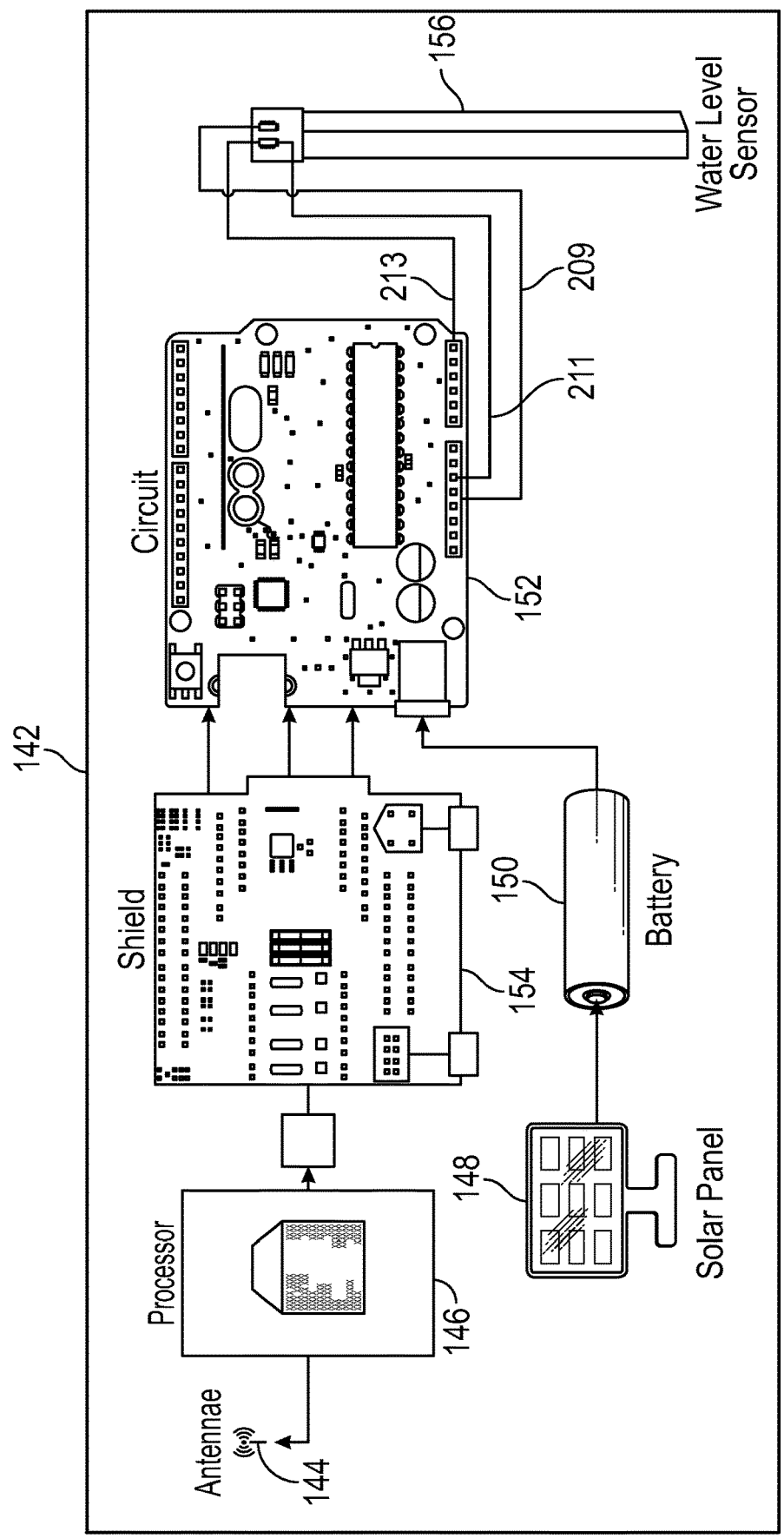
FIG. 2 shows components of a trough according to an embodiment of the disclosure.

FIG. 2, shows an embodiment in which the components are installed on a water trough 142 are shown. The components have been described in relation to FIG. 1. These include antenna 144, processor 146, solar panels 148, battery 150, shield 154 and processor 152. Bi-directional connections between sensor 156 and processor 152 are shown as 209, 211 and 213. The sensor 156, which is shown as a water level sensor, may be mounted in the water trough, along with a float, which is coupled to control a pump in the pump house, which may be utilized to ensure that when the water level sensor 156 in the trough detects a low-water state, an alert is transmitted to the appropriate personnel, smart phone, user interface, display terminal, monitoring systems, display systems, or other suitable location, and/or water is pumped from the pump house into the water trough that has sensed a low water condition.

Thus, a low water condition in a water condition in a water trough has been remediated without human action to physically replenish water into the trough.

Figure 3:
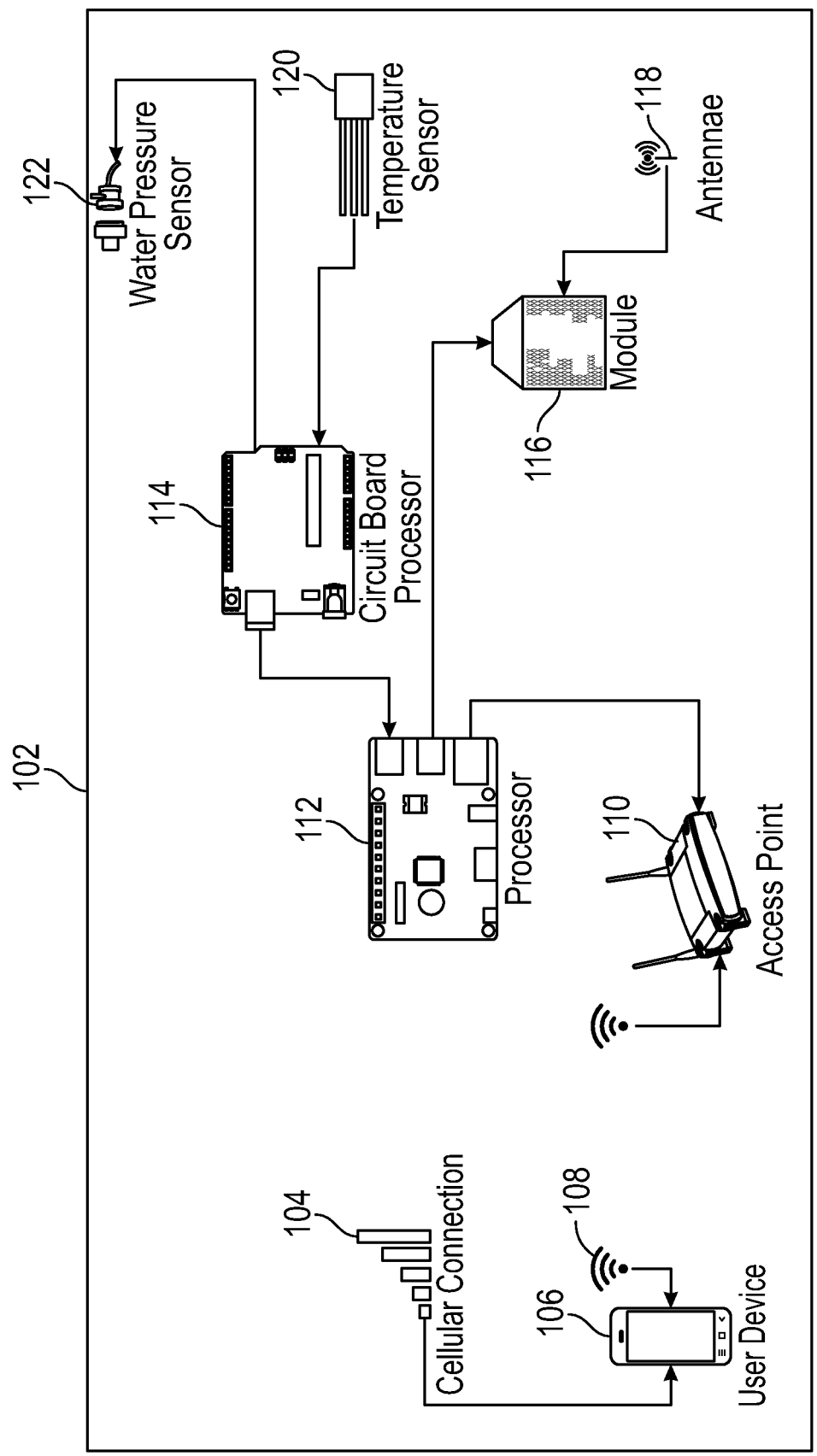
FIG. 3 shows components of a pump house according to an embodiment of the disclosure.

FIG. 3 shows components of a pump house 102 according to an embodiment of the disclosure. The components installed at a pump house 102 have been described in relation to FIG. 1 herein. These components include a cellular network, or cellular connection 104, a user device 106, which may be a smart phone, user interface, graphical user interface, laptop, personal computer or other device that provides a display or representation to a user. Network 108, such as the Internet, WAN, LAN, or other connection mechanism is in communication with device 106. Temperature sensor 120 provides sensed data to circuit board processor 114.

Water pressure sensor 122 is also in communication with circuit board processor 114. Circuit board 114 provides signals to a processor 112, shown as a Raspberry Pi®. Raspberry Pi® processor 112 provides signals to access point 110. Access point 110 is configured to transmit signals to user device 106 via network 108. The processor 112 provides output to module 116, which receives signals from antenna 118.

Figure 4:
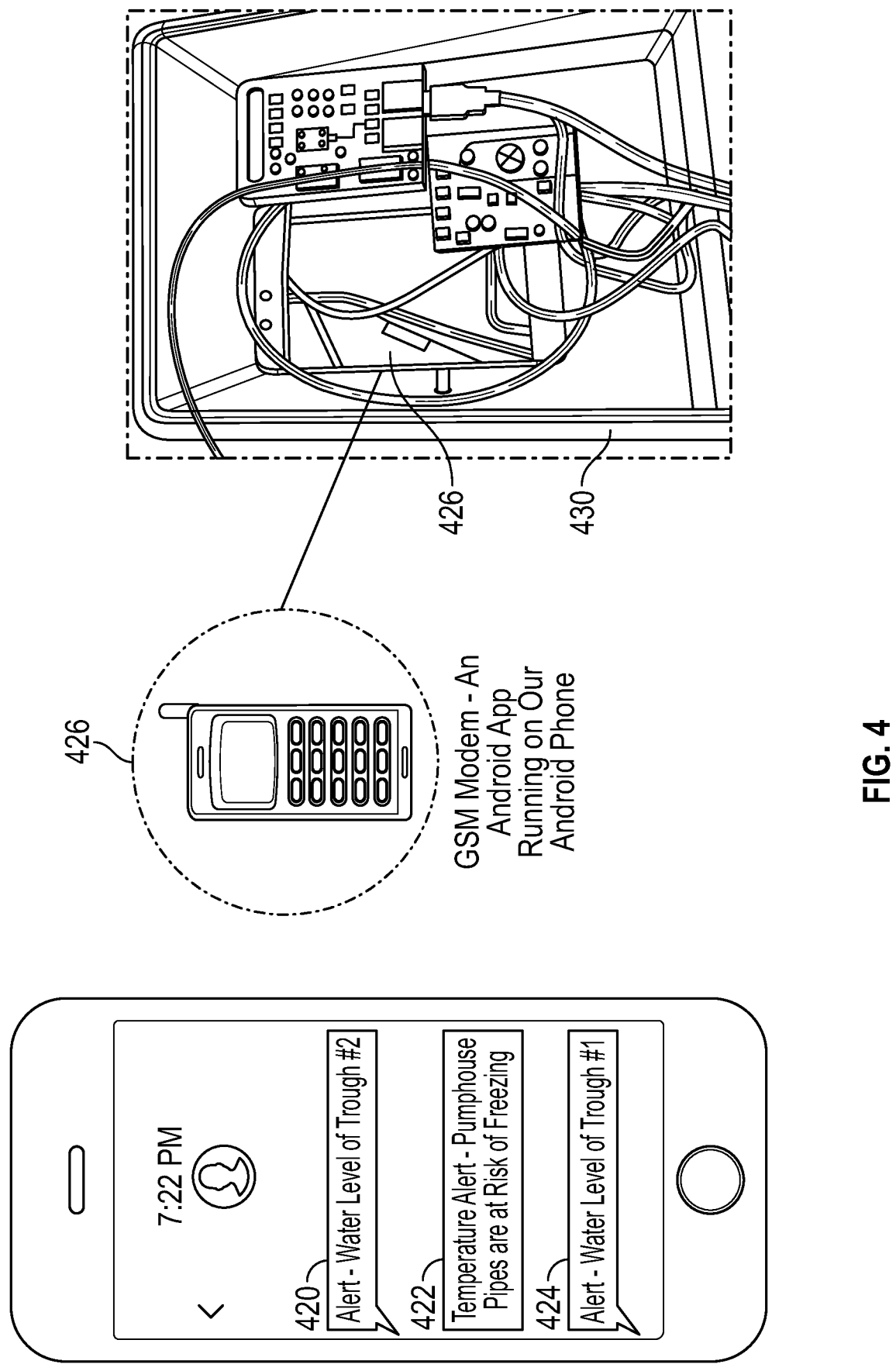
FIG. 4 shows an embodiment of an alert transmission according to an embodiment of the disclosure.

FIG. 4 shows an embodiment of an alert transmission according to an embodiment of the disclosure. As shown in FIG. 4, circuitry 430 receives and processes sensed data sent by sensors on one or more physical and/or virtual objects, which may include one or more water troughs shown as element 142 herein, and those generated at the pump house, shown as element 102 herein. The receptive circuitry 430 determines alerts and provides an alert indicator to an electronic device 428 via a wireless modem 426, such as a smart phone configured as a GSM modem with message gateway functionality, or other suitable receptive device. The device 426 is adapted to display or output an alert or other indication 420, 422, 424, which is indicative of a sensed condition at a trough (142) or pump house (102) as shown herein.

The wireless modem 426 is responsible for transmitting to a user and/or a system (e.g., database, website) shown as smart phone 428 the alert and/or notification messages using a wireless data communications network. The wireless modem 426 can be configured to select one of a plurality of networks, which may include, but not limited to, one or more of the following wireless data communications networks: Cellular, Satellite, UHF, and Wireless Local Area network. The modem 426 may be a GSM modem and/or an application running on a phone 428. The wireless data communications network is selected by the wireless modem according to a set of quality of service measures or criteria including, but not limited to, transmission and propagation delays, availability, time of day, speed, and cost of each of the wireless data communications networks.

The modem 426 provides data to the smart phone 428, which may be displayed as content 420, 422 and 424. Additional content, or messages, may also be displayed on smart phone 428. As shown in FIG. 4, multiple messages (420, 422, 424) related to multiple physical and/or virtual objects may be displayed on a single interface, such as the screen of a smart phone 428.

Figure 5:
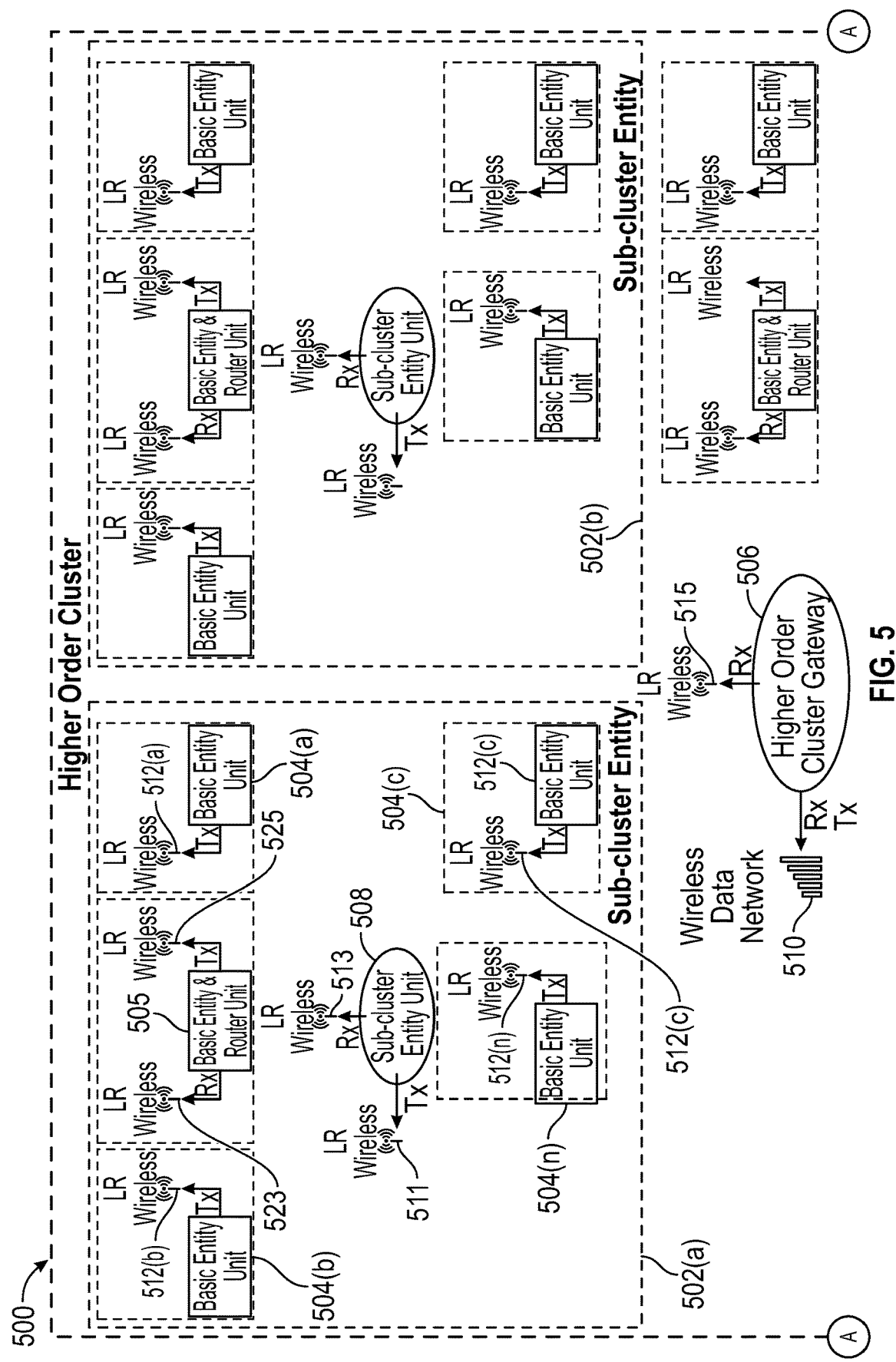
FIG. 5 shows a representation of a group of adaptive sub-cluster entity units forming an adaptive cluster or an adaptive higher order cluster.
Figure 5:
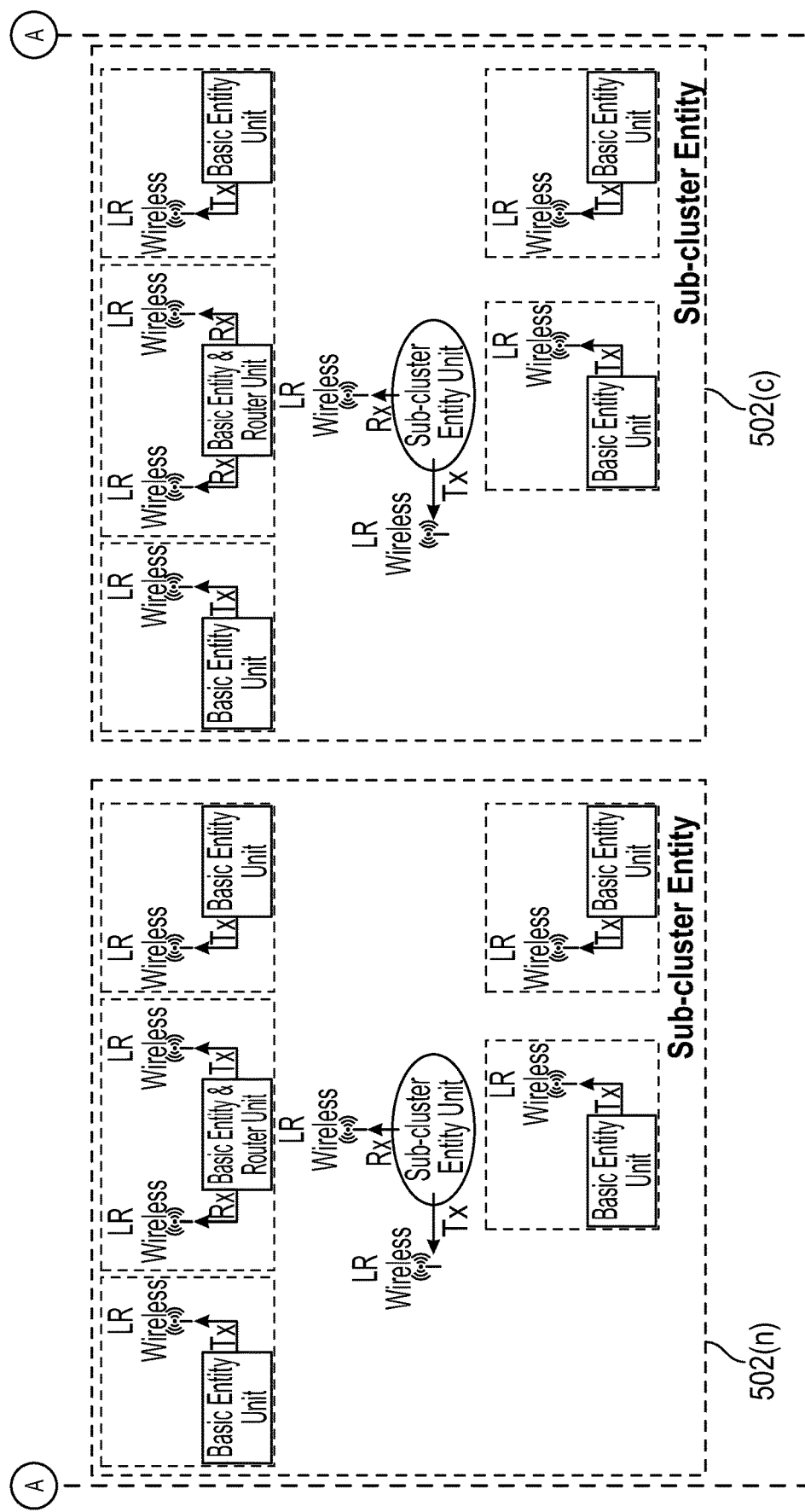
Figure 12:
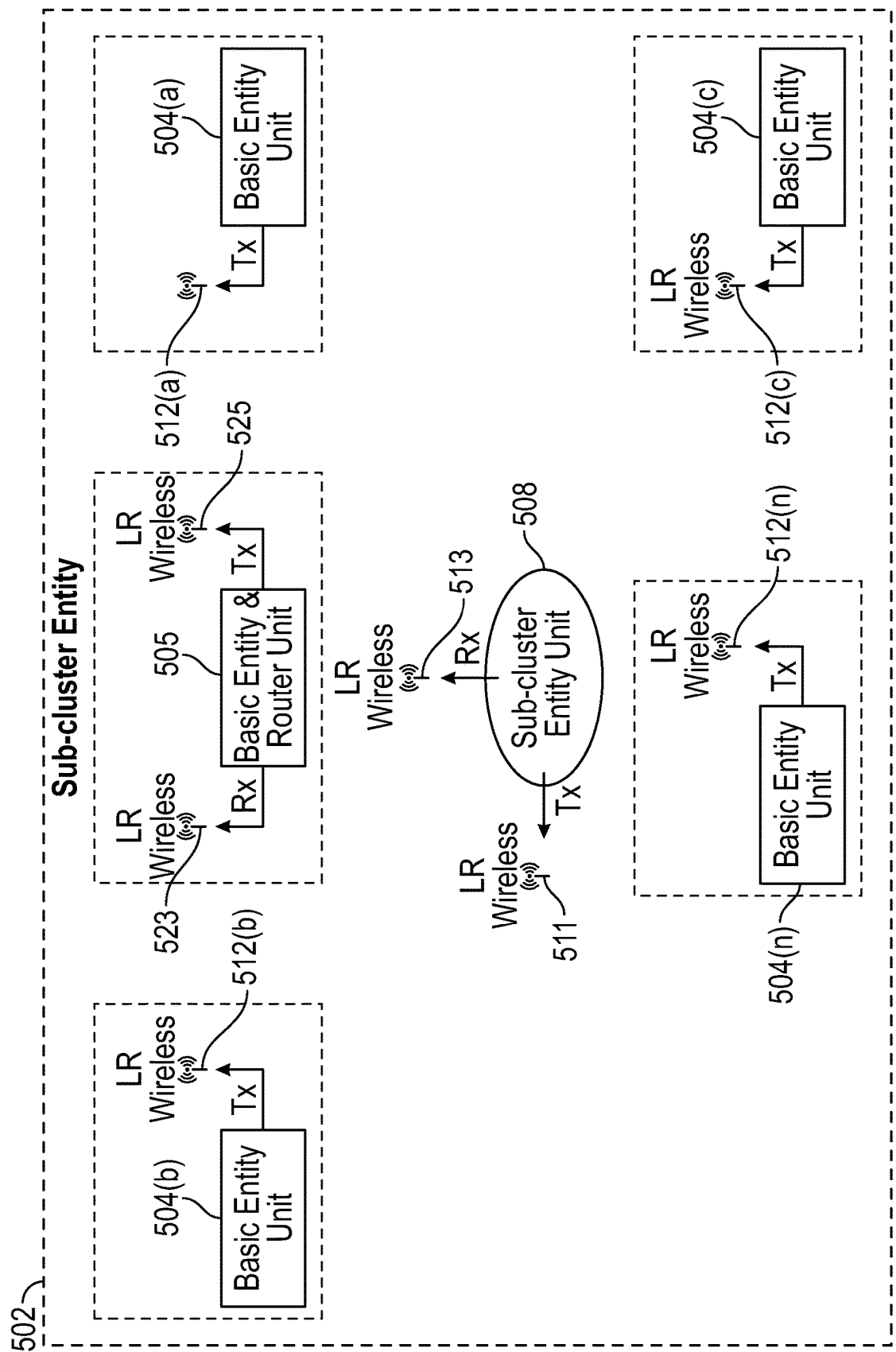
FIG. 12 shows an adaptive sub-cluster entity where adaptive basic entity units are served by an adaptive sub-cluster entity unit.

To implement an approach that can be customized for different farm sizes, that is, being scalable, the disclosure is based on adaptive nested cluster structure and architecture, as shown in FIG. 5 and FIG. 12.

FIG. 5 shows a representation of an adaptive cluster (or higher order cluster) 500 comprising a group of adaptive sub-clusters 502 (a) ... (n) (where "n" is any suitable number). The adaptive sub-clusters (generally 502) are served by an adaptive cluster gateway (or adaptive higher order cluster gateway) 506, which is associated with multiple adaptive sub-clusters, generally 502.

As shown in FIG. 5, the adaptive cluster (or adaptive higher order cluster) 500 includes adaptive sub-clusters 502(a) ... (n) and each adaptive sub-cluster (generally 502), which includes one or more adaptive basic entity units 504(a) ... (n) (where "n" is any suitable number), one or more adaptive basic entity and router units 505 and an adaptive sub-cluster entity unit 508, which is associated with the adaptive basic entity units, generally 504 and 505 of adaptive sub-cluster 502(a).

Using adaptive sub-cluster 502(a) as an example for descriptive purposes, FIG. 5 and FIG. 12 show that adaptive sub-cluster 502(a) includes one or more adaptive basic entity units 504(a) ... (n) (where "n" is any suitable number) and one or more adaptive basic entity and router units 505. Adaptive sub-cluster 502(a) also includes an adaptive sub-cluster entity unit 508 that has an associated low rate (LR) highly available wireless radio transmitter 511 and radio receiver 513. Highly available relates to the network being accessible from multiple locations, or modules, or devices. Highly Available Each adaptive basic entity unit (generally 504) includes an associated LR highly available wireless radio transmitter device 512 (generally). That is, adaptive entity unit 504(a) has LR highly available wireless device 512(a); adaptive entity unit 504(b) has LR highly available wireless device 512(b); adaptive entity unit 504(c) has LR highly available wireless device 512(c); and adaptive entity unit 504(n) has LR highly available wireless device 512(n).

Each adaptive basic entity and router unit 505 has LR highly available wireless devices radio receiver 523 and radio transmitter 525.

Adaptive cluster gateway (or adaptive higher order cluster gateway) 506 interfaces with wireless data communications network 510 and includes LR highly available wireless 515. Adaptive cluster gateway 506 is in bi-directional communication with adaptive sub-cluster entity units 508.

In one embodiment, in contrast to the adaptive cluster gateway (adaptive higher order cluster gateway in FIG. 5 or adaptive basic cluster gateway in FIG. 6) 506, the adaptive sub-cluster entity units 508 are typically not responsible for sending out alert or notification messages. However, these units 508 send the aggregated digital data streams (sensed data from multiple adaptive basic entity units 504, adaptive basic entity and router units 505 serving multiple objects and their associated sensors) to an adaptive higher order cluster gateway 506. Multiple adaptive sub-cluster entity 502 (in FIG. 5 and FIG. 12) may be used to form an adaptive higher order cluster that is served by an adaptive higher order cluster gateway unit 506. The adaptive sub-cluster entity unit 508 communicates its digital data streams to the adaptive higher order cluster gateway unit 506 using a low rate highly available license-free radio transmitter 511.

Under certain rule-based and/or pre-defined criteria (such as failure of an adaptive cluster gateway), a unit (508 in FIG. 5 and FIG. 12) initially configured as an adaptive sub-cluster entity unit could automatically become an adaptive basic cluster gateway unit (506 in FIG. 6) to its own adaptive basic entity units (502(a) ... (n) in FIG. 5) and adaptive basic entity and router units (504 and 505 in FIG. 5) and other adaptive sub-cluster entity units (in FIG. 5 and FIG. 6). Also, a unit that has been initially configured as an adaptive cluster gateway unit (506 in FIG. 5, FIG. 6 and FIG. 8) may become automatically an adaptive basic entity unit (504 in FIG. 5 and FIG. 7), adaptive basic entity and router unit (505 in FIG. 5 and FIG. 9) or adaptive sub-cluster entity unit (508 in FIG. 5, FIG. 10 and FIG. 12) in the case of the unavailability of acceptable wireless data communications network services.

In addition to the ability of the system 500 to send alert messages and notification messages to users, smart phones, user interfaces, graphical user interfaces, systems (websites) and/or databases, it is capable of displaying the same alert messages and/or notifications as additional information layer(s) on a map which identifies the location of the monitored stationary and/or mobile adaptive basic entity units 504, adaptive basic entity and router units 505 and/or objects, such as a water trough, barn door, person, tractor, or virtual object. An indicator may be associated with the sensed data signals. The indicator provides a status level of the importance of the sensed data signals, such as how critical a sensed event is. For example, a low or very low indication of water level will be assigned a higher priority than the temperature reading in a barn.

In the case of a mobile monitored adaptive basic entity unit, the sensed data includes the adaptive basic entity unit and associated objects coordinates for the most current location and status.

A group of adaptive basic entity units 504 (including those configured as adaptive basic entity and router units 505) along with the serving adaptive basic cluster gateway 506 make up an adaptive basic cluster in the case where the adaptive gateway is also configured and equipped with the capabilities to transmit alerts and notifications to a user or a system, or a smart phone, or user interface or memory location, using wireless data communications networks such as cellular, satellite, UHF, or other wireless services. In the case where the adaptive cluster gateway 506 serving multiple adaptive basic entity units 504, 505 is configured to transmit its aggregated digital data streams (not alert or notification messages but aggregated sensed digital data streams) to an adaptive higher order cluster gateway using low rate highly available license-free radio transmitter unit, the adaptive gateway along with the served adaptive entity units is referred to as adaptive sub-cluster entity 502.

Figure 6:
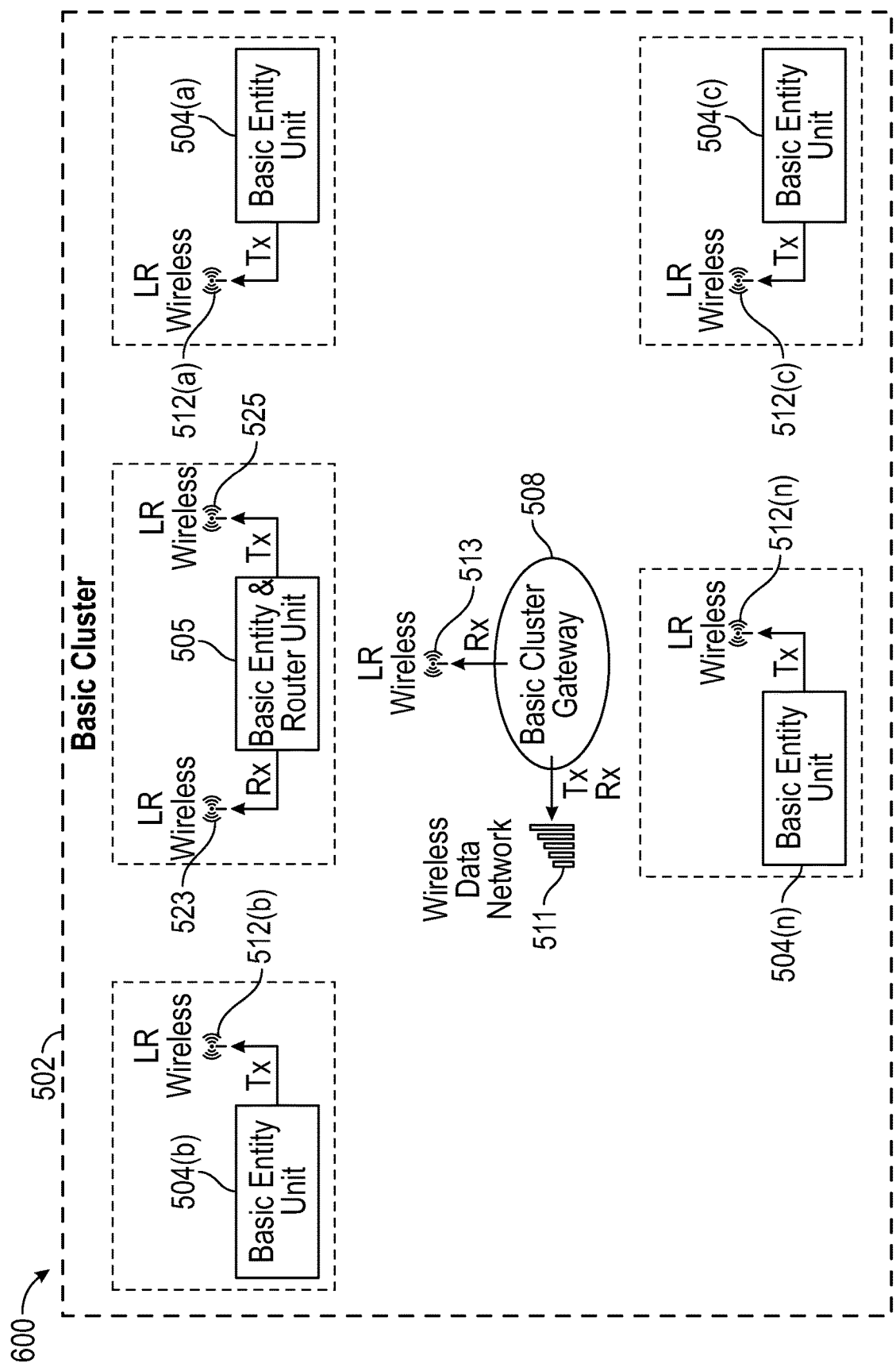
FIG. 6 shows a composition of one adaptive basic cluster.

FIG. 6 shows the composition of one adaptive basic cluster 600, which serves multiple adaptive basic entity units 504(a), (b), (c) . . . (n) (where "n" is any suitable number) and adaptive basic entity and router units 505 using an adaptive basic cluster gateway 506, via transmission and/or reception. The adaptive basic cluster gateway 506 has access to wireless data network 510, which includes a receiver and transmitter, and LR highly available wireless network 515. Each adaptive basic entity unit (generally 504) has an associated LR highly available wireless 512. Adaptive basic entity and router units 505 have LR highly available wireless radio receiver 523 and LR highly available wireless radio transmitter 525.

A group of adaptive basic entity units, shown as 504(a) . . . (n) and 505 herein, for example, a group of water troughs are served by an adaptive gateway 506 using many to one low rate highly available license-free wireless radio networks 515. That is, the radio receiver at the adaptive basic cluster gateway location 506 is capable of receiving and processing digital data streams from multiple associated radio transmitters generally 512, 525 (where each adaptive basic entity unit 504, 505 is served by a radio transmitter, generally 512, 525, as shown in FIG. 6. The LR highly available wireless radio successful communication typically requires a visible transmission path, also referred to as a line of sight between each of the LR highly available radio transmitters 512 and the adaptive basic cluster gateway LR highly available radio receiver 515.

In the case where an adaptive basic entity unit, generally 504, that is served by an LR highly available radio transmitter generally 512, may not have a visible transmission path, or line of sight, to the adaptive basic cluster gateway 506 (LR highly available radio receiver 515), that entity 504 may communicate its digital data stream to an entity 505 that is configured to function as an adaptive basic entity and router unit.

Thus, any number of adaptive entity units 504 that do not have direct line of sight, or visible transmission path, with the adaptive gateway radio receiver 515 of basic cluster gateway 506 may utilize basic entry and router unit 505 to receive data from basic entity units 504(a) . . . (n) and the basic entry router unit 505 is configured to transmit data received from basic entity units 504. The data received from one or more basic entity units 504 by basic entity and router unit 505, may be transmitted to a desired receiver location. This location may be a gateway 506, user device, laptop, server, drone or any other location suitable to receive data from basic entity and router unit 505.

More than one adaptive basic entity unit 504 may be configured as adaptive entity and router units 505 for high availability, scalability, redundancy and diversity.

Thus, adaptive basic entity and router unit 505 provides pathway, or conduit, or communication channel or link to permit basic entity units 504 a way to communicate data and information to a destination, such as a smart phone, drone, user interface or other device or memory when the basic cluster gateway 506 is not within a line of sight or is otherwise not able to fulfill its function.

When information is communicated to a drone, the drone can transmit the information to yet another location or destination. Thus, the drone may be a destination or an intermediary transceiver that receives information and transmits the information to another destination.

An adaptive basic cluster or adaptive higher order cluster gateway 506 may also serve objects (stationary or mobile) such as a water trough, tractor, drone, gate, and other physical object or virtual objects that are located at the adaptive basic cluster gateway 506 or the adaptive higher order gateway location. For example, an adaptive basic cluster or adaptive higher order cluster gateway 506 location may be the water pump house that is serving multiple water troughs (examples of multiple entity units, 504). The water pump itself could represent an object that can be equipped with one or more sensors, such as water pressure sensor, temperature sensor, or other suitable sensor, or information gathering device.

Figure 7:
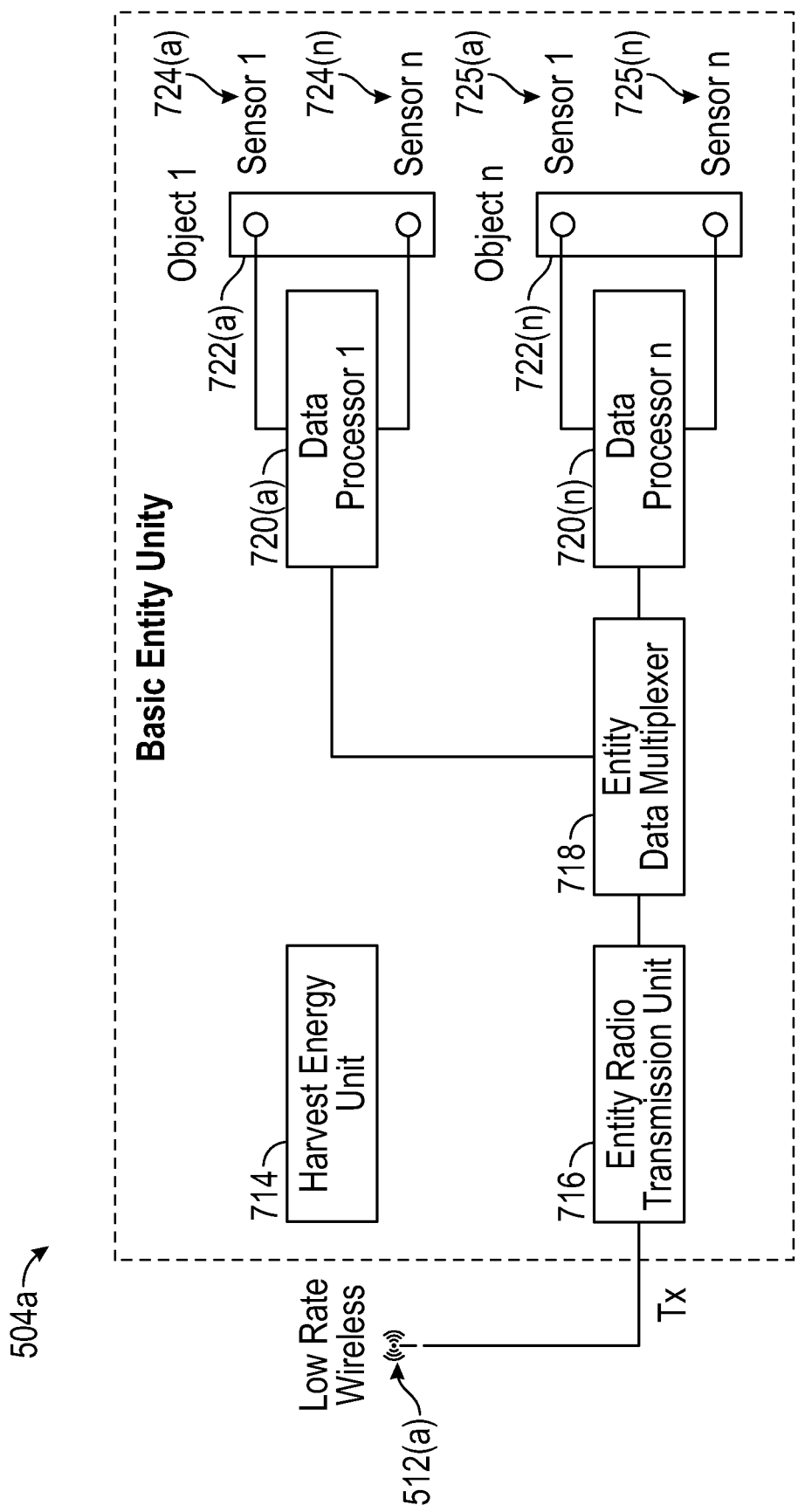
FIG. 7 shows an example of an adaptive basic entity unit.

FIG. 7 shows an example of an adaptive basic entity unit, shown herein generally as 504 that may be disposed within an adaptive basic cluster or adaptive higher order cluster which is served by an adaptive basic cluster or an adaptive higher order cluster gateway as shown as element 506 herein. The adaptive basic entity unit 504(a) may be stationary or mobile, or movable.

As shown in FIG. 7, adaptive basic entity unit 504(a) includes a low rate (LR) wireless transmitter 512(a), harvest energy unit 714, entity radio transmission unit 716, entity data multiplexer 718, a plurality of data processors 720(a) . . . 720(n), where "n" is any suitable number, a plurality of objects 722(a) . . . (n), where "n" is any suitable number and a plurality of sensors 724 (a) . . . (n) and 725(a) . . . (n), where "n" is any suitable number. As shown, sensors 724(a) . . . (n) are associated with object 722 (a) and sensors 725(a) . . . (n) are associated with object 722(n).

A number of objects 722(*a*) . . . (*n*), where "n" is any suitable number, could be grouped into an adaptive basic entity unit (shown herein generally as 504, 505). Objects 722 could be physical objects and/or virtual objects or a combination of physical and virtual objects. That is, an adaptive entity unit (shown herein generally as 504, 505) may comprise a plurality of objects 722. Each object 722, whether physical or virtual and its associated sensors 724 or 725, in an adaptive basic entity unit (shown herein as 504, 505), is typically served by an analog and/or digital data processor unit generally 720. The data processor units, generally 720, may provide power, signal conditioning and encoding functions to the sensors 724, 725 of the objects 720. The generated data from the data processors, generally 720, serving multiple objects 722 are aggregated into one digital data stream by an adaptive entity digital multiplexer unit 718. The multiplexed digital data stream is served by a low rate (LR) highly available license-free wireless radio transmitter 716. Each adaptive basic entity unit 504 is powered using a harvest energy source 714, such as solar, thermal, vibration and/or RF.

The adaptive basic entity unit 504 comprises multiple objects 722, such as troughs, where each object 722 is served by multiple sensors 724, 725.

As shown in FIG. 7, one adaptive basic entity unit 504(*a*), which is representative of the adaptive basic entity units described herein generally, has a low rate highly available wireless transmitter device 512(*a*), harvest energy source 714, entity radio transmission unit 716, entity data multiplexer 718, one or more data processors 720(*a*) and (*n*) (although two data processors, generally 720, are shown, any suitable number may be used), one or more objects 722(*a*) and (*n*) (although two objects, generally 722, are shown, any suitable number may be used). Also shown are sensors 724(*a*) and 724(*n*) associated with the object 722(*a*). While two sensors 724(*a*) and (*n*) are shown in conjunction with object 722(*a*), any suitable number of sensors, generally 724 may be used. Object 722(*n*) has associated sensors 725(*a*) and 725(*n*). While two sensors 725(*a*) and (*n*) are shown in conjunction with object 722(*n*), any suitable number of sensors 725 may be used.

Harvest energy source 714, is a circuit that obtains a source of energy, such as solar derived energy or energy from other energy source and uses that energy to power the entity 504(*a*). Also, the harvest power source 714 may harvest RF, thermal or vibration energy or other sources or forms of energy.

Entity data multiplexer 718 aggregates data from multiple data processors 720 and sends the data to the adaptive entity radio transmission unit 716 which transmits an RF signal through a network, which may be a low rate (LR) highly available wireless network. Entity data multiplexer 718, which is operatively coupled to one or more processor units, shown as data processors 720(*a*) . . . (*n*), where "n" is any suitable number (although two data processors, generally 720, are shown, any suitable number may be used). The data processors are operatively coupled to an associated one or more objects, 722(*a*) . . . (*n*), where "n" is any suitable number.

As shown in FIG. 7, data processor 720(*a*) is operatively coupled to object 722(*a*) and data processor 720(*n*) is operatively coupled to object 722(*n*). The objects (generally 722) are operatively coupled to one or more sensors 724(*a*) . . . (*n*) (object 722(*a*)) and 725(*a*) . . . (*n*) (object 722(*n*)).

Figure 8:
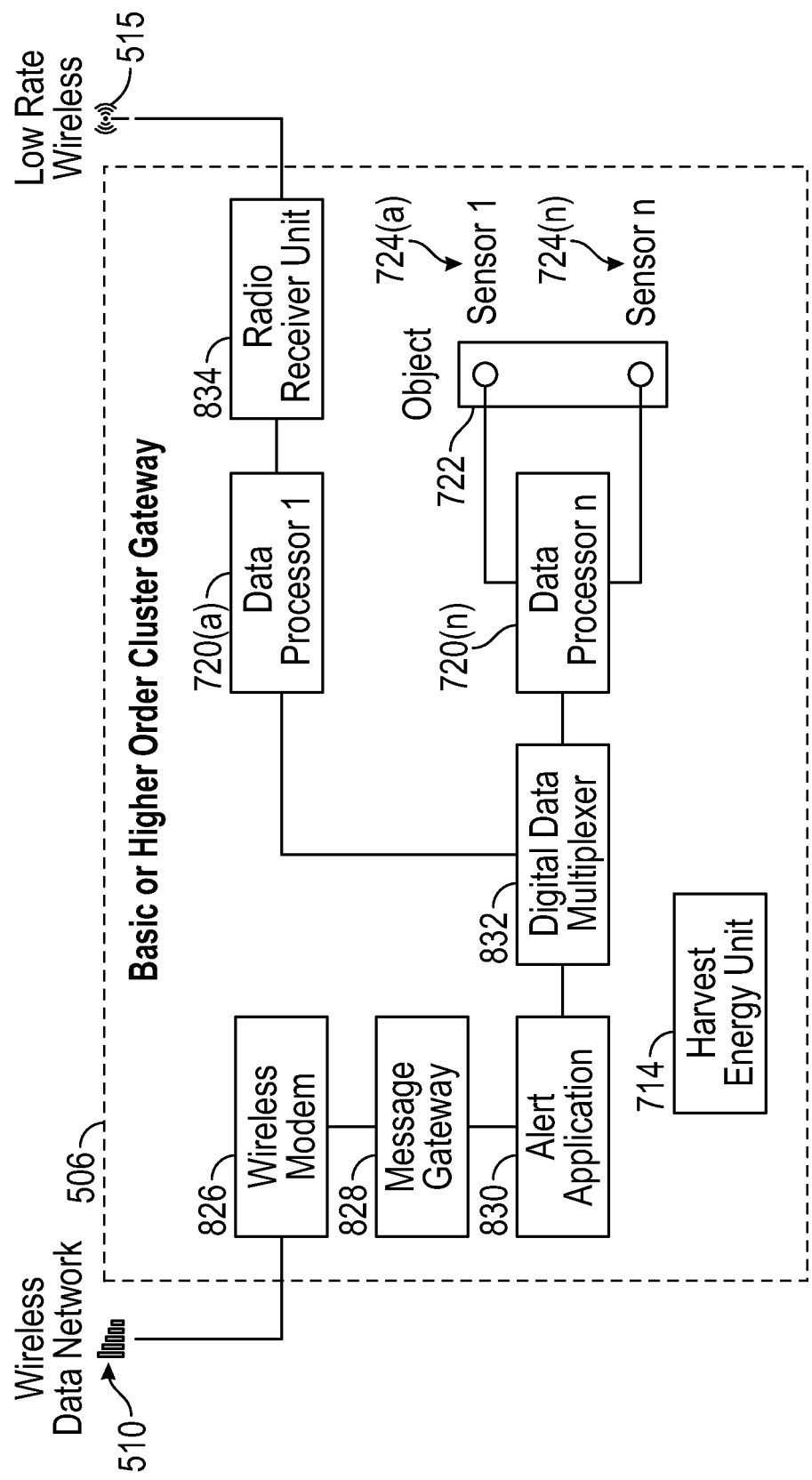
FIG. 8 shows a gateway configured to serve an adaptive basic cluster or an adaptive cluster (also called adaptive higher order cluster).

FIG. 8 shows that an adaptive basic or adaptive higher order cluster gateway 506 may serve an adaptive basic cluster or an adaptive higher order cluster.

As shown in FIG. 8, adaptive basic cluster, or adaptive higher order cluster gateway 506 includes one or more sensors 724(*a*) . . . (*n*) where "n" is any suitable number, low rate (LR) wireless receiver 515, radio receiver unit 834, a plurality of data processors 720(*a*) . . . (*n*), where "n" is any suitable number, digital data multiplexer 832, alert application (app) 830, message gateway 828, wireless modem 826, wireless data network 510 and harvest energy source 714.

An adaptive gateway 506 has two different RF radio units, one 515 for gathering sensed data from multiple adaptive basic entity units (504, 505) or adaptive sub-cluster entity units (508) and the other 510 to send alert and notification messages to individuals mobile and/or stationary devices.

Figure 10:
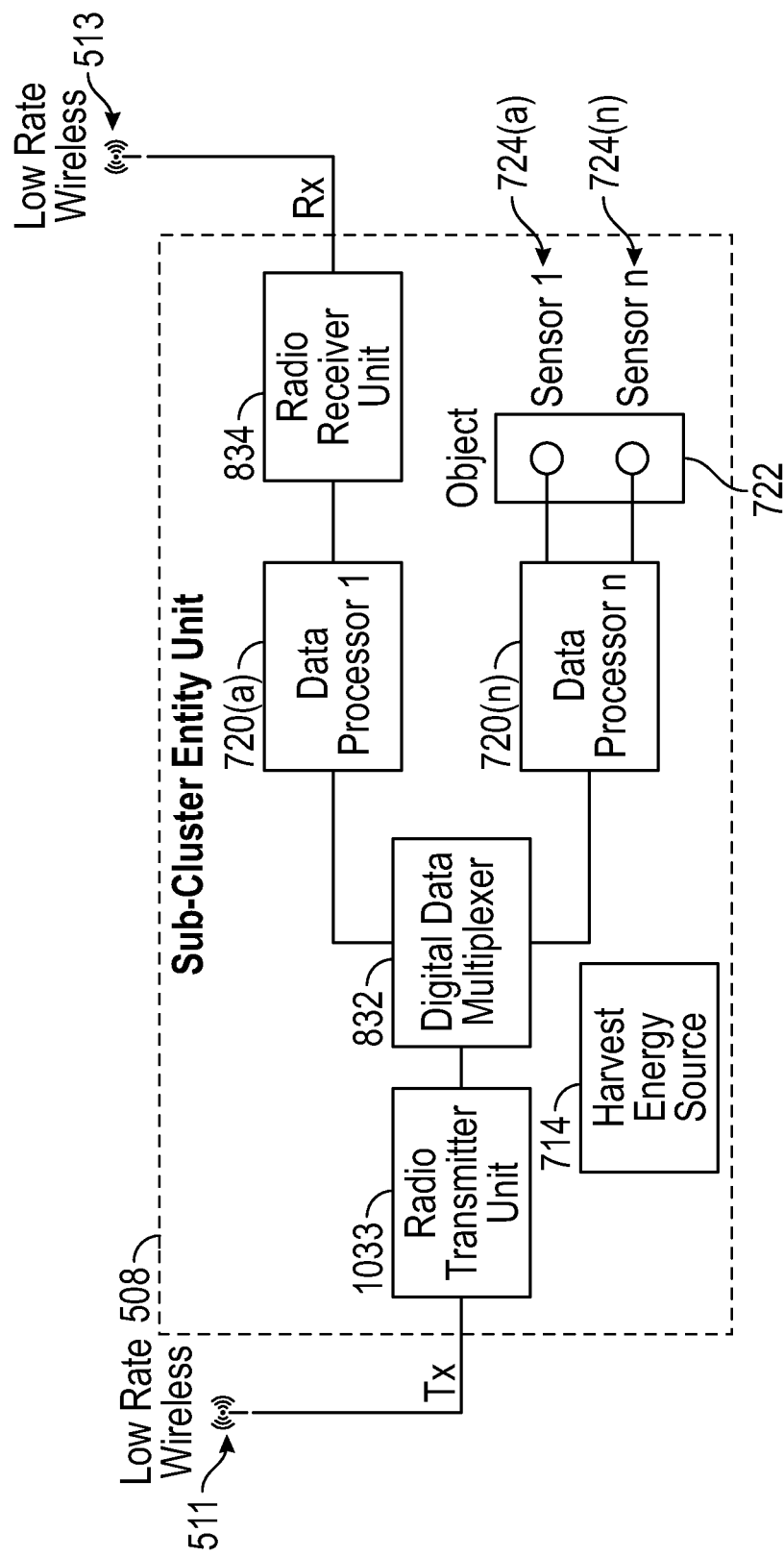
FIG. 10 shows a configuration of an adaptive basic gateway configured as adaptive sub-cluster entity unit.

The adaptive higher order cluster and adaptive basic cluster gateways 506 and the adaptive sub-cluster entity units (as shown as element 508 in FIG. 10) have a common set of functional components. These functional components are shown in FIG. 8 and FIG. 10. These include the LR highly available license-free radio receiver 515 (element 513 of element 508 in FIG. 10).

Objects 722 is equipped with sensors 724, data processor units 720 and a digital data multiplexer 832. The last two components, as shown in FIG. 8, are similar to those provided under the adaptive entity unit (element 504 herein) description. The alert and notification application (app) 830 may be configured to communicate to the message gateway component on-board 828, through wireline connection or through a wireless local area network.

As shown in FIG. 8, basic cluster gateway, or higher order cluster gateway 506 is in communication with wireless data network 510 and a wireless network through LR highly available wireless receiver 515. The adaptive basic cluster gateway or adaptive higher order cluster gateway 506 comprises a wireless modem 826, message gateway 828, alert application 830, digital data multiplexer 832, data processors 720(*a*) . . . (*n*) where "n" is any suitable number, radio receiver unit 834, object 722 and sensors 724(*a*) . . . (*n*).

The alert/notification application 830 is configured to process sensed digital data streams on a periodic basis and determine whether an alert or notification is necessary to be communicated to a user, via a smart phone, tablet, laptop or other user interface or device or display device or a system based on a predefined set of criteria (e.g., threshold crossing of water level, change in temperature, soil moisture range limits, and other user defined criteria). In the case that an alert or notification is necessary, a request is generated by the alert/notification application (app) 830 and is forwarded to the message gateway component 828.

The message gateway access point, or component 828 is configured to map the alert and/or notification requests into a message or messages to be fed into one or more wireless modems 826. The message gateway access point or component 828 may be configured to map a request into one of the following exemplary message types: Short Message Service (SMS) text message, Multimedia Message Service (MMS) message, mobile call, Public Switched Telephone Network (PSTN) call, Voice over IP (VoIP) call, web hypertext transfer protocol (http) message, web hypertext transfer protocol secure (https) message, cell phone call, email, text and/or database insertion message. Other message types may also be used.

The alert/notification application component may send a frequent keep-alive data (user configurable/customized times or time periods) on behalf of one or more of the adaptive entity 502 and/or the adaptive sub-cluster entity units 504 to the adaptive cluster gateway 506, 508 and/or the users or databases. This is to meet the reliability requirements of the entire system.

In addition, the entire system including the adaptive entity 502, adaptive sub-cluster entity 504 and adaptive cluster gateway units 506, 508 may be configured to adaptively re-routing of digital data streams through alternate route(s) in the case of the initially selected route fails or becomes unavailable. The route may be unavailable due to obstacles and/or occlusions in the transmission path between two or more components of the system.

Figure 9:
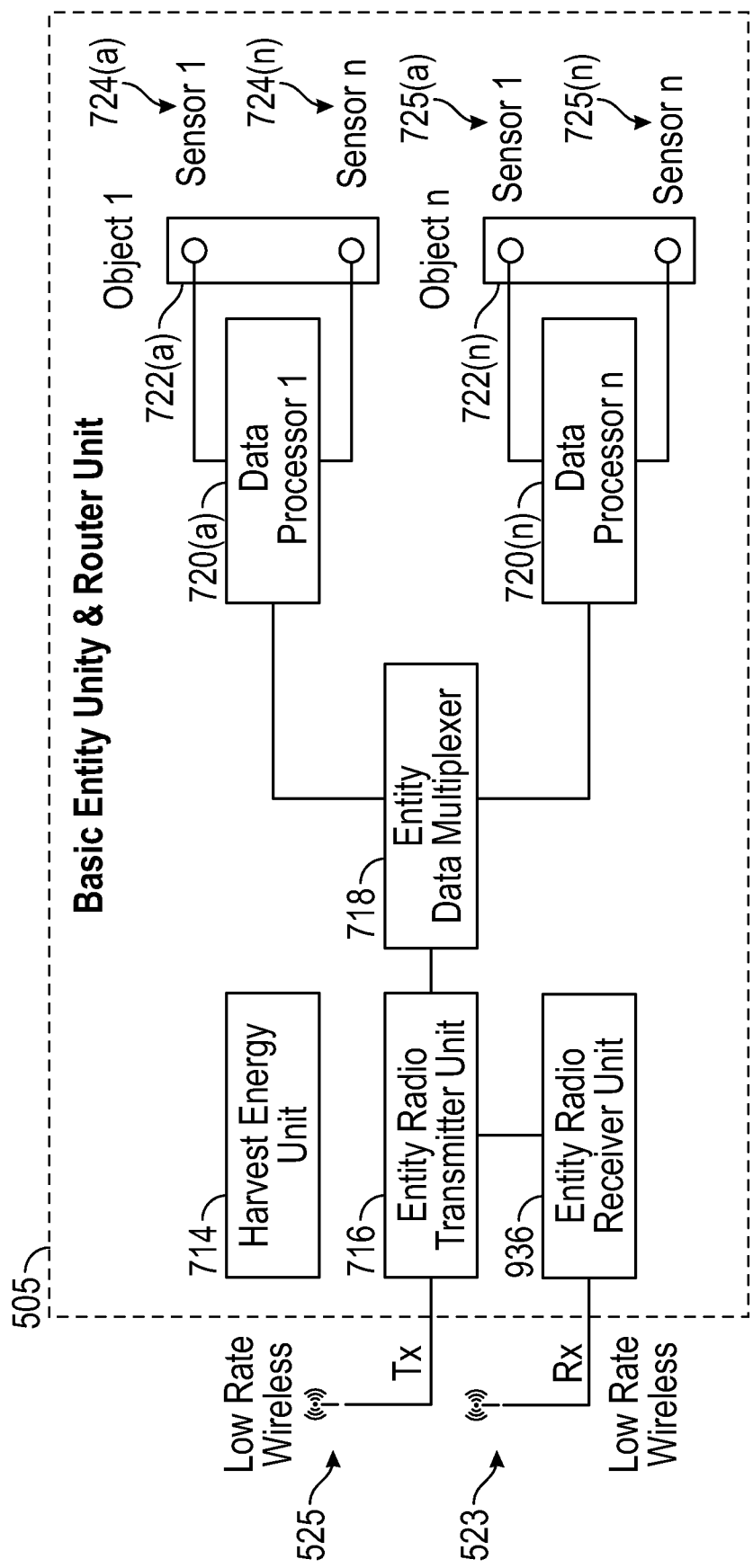
FIG. 9 shows an adaptive basic entity unit configured to act as an adaptive entity unit as well as a router unit.

FIG. 9 shows a representation of a basic entity unit that is configured to act as an adaptive basic entity as well as a router on behalf of one or more other adaptive entity units that may not be able to reach the serving gateway component. The lack of ability to reach a serving gateway may be due to a number and/or a combination of factors. These factors include, lack of signal strength, lack of a line of sight, low transmission power or transmitter function, lack of receiver power or function, lack of bandwidth, lack of channel recognition, power failure or any other technical or physical impediment.

The basic entity unit has both a radio transmitter (LR highly available) and a radio receiver unit (LR highly available). As shown in FIG. 9, the adaptive basic entity and router unit 505 has an entity radio transmitter unit 716 coupled to low rate highly available wireless transmitter 525, and entity data multiplexer 718, which is coupled to one or more data processors 720(*a*) . . . (*n*) where "n" is any suitable number.

Each data processor 720 is coupled to one or more objects 722(*a*) . . . (*n*), where "n" is any suitable number, having one or more sensors of 724(*a*) . . . (*n*), "n" being any suitable number and 725(*a*) . . . (*n*) where "n" is any suitable number. The entity radio receiver unit 936 is coupled to low rate wireless receiver 523. Harvest energy source 714 is also shown.

FIG. 10 shows a representation of the configuration of an adaptive sub-cluster entity unit 508 as an entity, which may be served by an adaptive higher order cluster gateway (shown as element 506 herein). The adaptive sub-cluster entity unit 508 has receiving and transmitting functionality. LR highly available wireless receiver 513 is coupled to radio receiver unit 834, which is coupled to data processor 720(*a*), which is coupled to digital data multiplexer 832.

Digital data multiplexer 832 is coupled to data processor 720(*n*) and radio transmitter unit 1033, which is coupled to LR wireless transmitter 511. Object 722 and sensors 724(*a*) . . . (*n*) where "n" is any suitable number, have been described previously herein.

Figure 11:
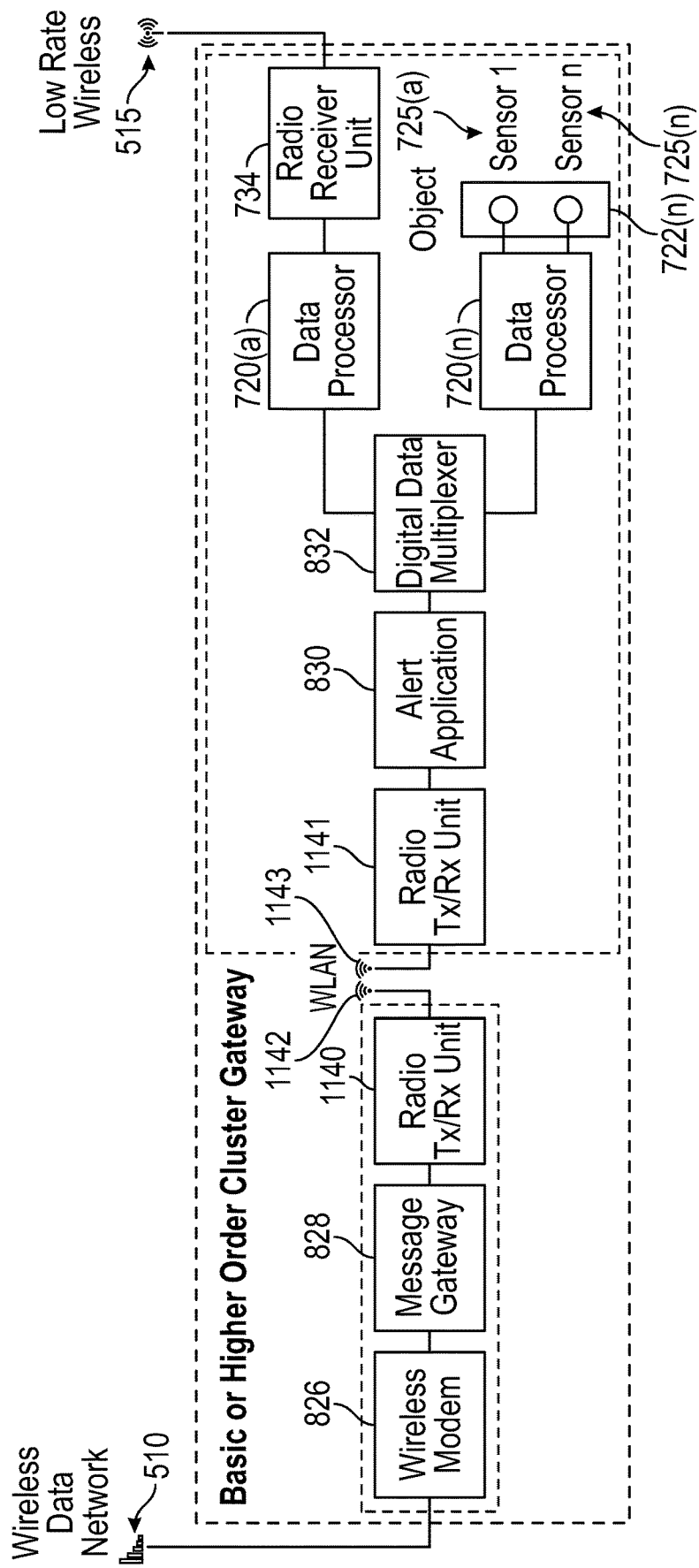
FIG. 11 shows an adaptive gateway that is configured so that the alert and/or notification application component communicates to the message gateway via a WLAN.

FIG. 11 shows a representation of an adaptive basic cluster or adaptive higher order cluster gateway in communication with an object sensor unit.

The adaptive basic or higher order cluster gateway includes a wireless modem 826, message gateway component 828 and radio transmit/receive unit 1140. The adaptive basic or higher order cluster gateway also receives information and/or data via WLAN 1142 and transmits information and/or data via wireless data network 510.

An alert monitoring unit includes LR (low rate) wireless transceiver 515, radio receiver unit 734, data processor 720(*a*), alert application 830, digital data multiplexer 832, alert application (app) 830 and radio transceiver unit 1141 in communication with WLAN 1143.

As shown in FIG. 11, alert/notification application (app) component 830 communicates to the message gateway component 828 via a WLAN 1143 and or 1142 rather than directly. This provides flexibility that allows the message gateway component 828 and wireless modem 826 to be located in a separate location from that where elements 830, 832, 720, 734, 725 and 722 are located. This embodiment includes radio transmit/receive units 1140, 1141 and wireless LAN (WLAN) 1142, 1143.

FIG. 12 illustrates the composition of one adaptive sub-cluster entity 502 which comprises multiple adaptive basic entity units 504, 505 and an adaptive sub-cluster entity unit 508. The components shown in FIG. 12 have been described previously herein.

As shown in FIG. 12, the basic entity and router unit 505 can facilitate communication and transfer of data and information between one or more basic entity units 504 and other basic entity units 504 as well as sub-cluster entity unit 508.

In view of the above-provided description, this disclosure describes three different use cases:

(1) all adaptive basic or stationary adaptive basic or adaptive higher order cluster gateway (water pump house), (2) a combination or mix of stationary and mobile adaptive basic or adaptive sub-cluster entity units (cows, drones, tractors, etc.) 504 are served by a stationary adaptive basic 508 or adaptive higher order gateway 506 (water pump house) and (3) a combination or mix of mobile and stationary adaptive basic or adaptive sub-cluster entity units 504 are served by a mobile adaptive basic 508 or adaptive higher order cluster gateway 506 (e.g., drone)

All units serving stationary and/or mobile objects are adaptive in terms of their abilities to determine and select the most available and reliable path to deliver the alert service to the intended user(s) and/or application(s) and/or destination(s).

Use Case 1 has been described herein in relation to FIGS. 1-5.

Use Case 2 relates to one or more basic 502 or sub-cluster entity units 504 being mobile and severed by a stationary adaptive basic 508 or adaptive higher order cluster gateway 506. A mobile adaptive basic 502 or adaptive sub-cluster entity unit 504 may serve one or more objects 722 and their associated sensors 724, 725. A mobile adaptive basic 502 or adaptive sub-cluster entity unit 504 may be served by one of the following units: stationary adaptive basic cluster gateway, stationary adaptive higher order cluster gateway or a stationary adaptive basic entity and router unit.

Thus, as described herein, and referring to FIGS. 1-12, it is to be understood that the embodiments described herein present an adaptive sensing and monitoring system since the role or function of a cluster, router and/or gateway may be interchangeable.

FIG. 1 shows one embodiment in which a sensor 156 is associated with an object, which is a water trough 142. The sensor 156 collects data regarding the parameters, such as water temperature, water level, water pressure of the trough 142. The sensed data signals from the trough 142 may be transmitted to the pump house.

Both the trough 142 and the pump house 102 can gather sensed data regarding the status of the trough 142 or pump house 102 and transmit data to a gateway 506, 508. Alternatively, the trough 142 and the pump house 102 can collect data from other objects, such as a tractor, fence post, gate, and transmit the sensed data to the trough 142, the pump house 102 or a gateway 506, 508.

The gateway 508 may serve sub-clusters 504(*a*) . . . (*n*) and router 505. The gateway 508 is configured to receive sensed data signals from one or more sub-clusters 504(a) ... (n) as well as router 505. The gateway 508 is also configured to collect sensed data in a manner similar to sub-clusters 504(a) ... (n) and router 505. Thus, while shown and described as a gateway, the gateway 508 may also gather data from an object or objects.

The gateway 508 has sensors and transmitter 511 and receiver 513. The gateway 508 is configured to collect sensed data, receive data from sub-clusters 504(a) ... (n) and higher order clusters 502(a) ... (n) and higher order gateway 506. The gateway 508 may also transmit data to sub-clusters 504(a) ... (n) and higher order clusters 502(a) ... (n) and higher order gateway 506.

Gateway 506 has similar functionality as gateway 508. Indeed, gateway 506 may serve sub-clusters 504(a) ... (n) and router 505. The gateway 506 is configured to receive sensed data signals from one or more sub-clusters 504(a) ... (n) as well as router 505. The gateway 506 is also configured to collect sensed data in a manner similar to sub-clusters 504(a) ... (n) and router 505. Thus, while shown and described as a gateway, the gateway 506 may also gather data from an object or objects.

The gateway 506 has sensors and transmitter 510 and receiver 515. The gateway 506 is configured to collect sensed data, receive data from sub-clusters 504(a) ... (n) and higher order clusters 502(a) ... (n) and sub-gateway 508. The gateway 506 may also transmit data to sub-clusters 504(a) ... (n) and higher order clusters 502(a) ... (n) and sub-gateway 508.

A mobile adaptive basic entity unit 502, 504 may be associated with a stationary adaptive basic 508 or adaptive higher order cluster gateway 506 directly if it has line of sight with that gateway.

In the case that the mobile adaptive basic entity unit does not have line of sight with a stationary adaptive basic or adaptive higher order cluster gateway, then it is configured to utilize a stationary adaptive basic entity that is configured as an adaptive basic entity and router unit as described herein.

Use Case 3 relates to a mobile adaptive cluster gateway configured to serve a group of stationary and mobile adaptive basic entity units. Use Case 3 utilizes a mobile adaptive basic cluster gateway that is capable of sending alerts or sending sensed digital data streams to available stationary adaptive higher order cluster gateway(s).

The mobile adaptive cluster gateway may be deployed as an emergency replacement of failed stationary adaptive basic cluster gateway, or stationary adaptive sub-cluster entity unit, or stationary adaptive higher order cluster gateway.

Each mobile adaptive basic cluster gateway 506, 508 may be assigned a scope of coverage to ensure that all mobile and stationary adaptive basic 502 or adaptive sub-cluster entity units 504 are highly available and reliably monitored and accounted for at all times.

The scope coverage may be enhanced by channel optimization and RF down-converting using energy sampling. Various techniques for down-conversion and energy sampling are described in U.S. Pat. No. 9,288,100, which is hereby incorporated by reference in its entirety herein. The energy sampling and down-conversion techniques enhance the ability for signals to be transmitted between the various objects, adaptive basic entity units, adaptive sub-cluster entity units, and adaptive basic and adaptive higher order cluster gateways.

In the case that the alert/notification application 830 assesses whether an alert request be communicated to the message gateway 506, 508 in response to a threshold crossing event, the process applied by the alert application 830 will minimize the possible false alert due to transient or intermittent events. The procedure involves the alert application 830 to wait until it receives a user defined number of consecutive threshold crossings for a given physical quantity (such as water level) over a user-defined period of time, such as an hour, before it sends an alert request to the message gateway 506, 508.

The number of consecutive threshold crossings to determine an alert request, or alert condition may be based, at least in part, on the number of repeated alerts, type of alert, weather conditions, sensed ambient temperature, time of day or night, whether there is a line of sight communication, whether alert relates to equipment, whether the alert relates to livestock, other sensed conditions and other parameters that affect the severity of a condition.

In the case where an adaptive sub-cluster entity unit 504 is configured to automatically and adaptively become an adaptive basic cluster gateway 506, 508 (capable of sending alert messages using wireless data network), the selection criteria is based, at least in part, on the quality of service measures of the low rate wireless link between the adaptive sub-cluster entity unit 504 and the adaptive higher order cluster gateway 506. For example, if the unit (initially configured as an adaptive sub-cluster entity unit 504) does not receive an acknowledgment from the adaptive higher order cluster gateway 506 after a predetermined number of attempts or user-configured number of attempts (e.g., three attempts) spread over a user-defined time period (e.g., an hour), then the unit 504 reverts to be an adaptive basic cluster gateway 508 and sends the alerts to the intended user or system defined in the alert/notification application.

This dictates that the alert/notification user/system data be continuously synchronized between the alert application 830 on the adaptive basic 508 and adaptive higher order clusters 506.

Each adaptive cluster gateway 506, 508 exercises its own correlation analyses on the sensed data and keep-alive data across objects within an adaptive basic entity unit and across adaptive basic entity units and serving adaptive gateway or adaptive sub-cluster entity units.

The purpose of the correlation is to pinpoint a single downstream failure event that may have triggered or is deemed to be the root cause of multiple upstream alert events and messages. Also, it facilitates the minimization of sending multiple alerts that are caused by the same failure. For example, a failure of the water pump in an adaptive basic cluster may result in many alert events generated by multiple water troughs.

In an embodiment in which a mobile gateway 506, 508 serves a group of stationary and mobile adaptive basic entity units 504, 505, 502, the position of the adaptive gateway 506, 508 is periodically and adaptively adjusted to maximize the number of adaptive entity units 502, 504, 505 served based, at least in part, on a set of quality of service criteria of the wireless links to each adaptive entity unit 502, 504, 505 in the mobile adaptive gateway area of coverage.

In the case a mobile adaptive entity unit 502, 504, 505 moves out of the adaptive gateway 506, 508 scope of coverage, the adaptive gateway 506, 508 sends an alert message to a user or a monitoring system. The alert is sent on a regular basis until the mobile adaptive entity unit 502, 504, 505 is back into the scope of coverage or the adaptive gateway 506, 508 is notified by a user or a system (including other gateways) that the mobile adaptive entity unit has moved into the scope of coverage of another stationary or mobile adaptive cluster gateway 506, 508.

The adaptive basic entity units 502, 504, including objects 722 sensors 724, 725, object data processors 720, entity data multiplexers 718 and low rate radio transmitter 716 and receiver units 936 are powered using harvested energy 714; the harvested energy source 714 is selected from the following sources: solar, thermal, vibration and/or RF based on a predefined set of criteria; where energy is harvested through the use of collectors and power management circuitry configured for one or more of the following energy sources: solar, thermal, vibration and/or RF.

Each adaptive mobile entity unit 502, mobile adaptive sub-cluster entity unit 504, mobile adaptive basic cluster gateway 508 or mobile adaptive higher order cluster gateway 506 may be configured to be powered using a harvest energy source 714 (such as solar, thermal, vibration and/or RF).

The alert messages may be programmed to be sent by the adaptive basic gateways 508 or the adaptive higher order cluster gateways 508 between certain time frames, such as certain hours, that are user configurable.

For example, a tractor may be operated by a user having a device, such as a smart phone in their possession. An indication may be received from an object (trough) that the water level is low and the pump house tank does not have an adequate volume of water to fill the trough. The user can receive a notification indicating that the water level in the trough is low and the pump house is not filling the trough. Indeed, multiple users may be contacted and the notification directed to the closest user to address the issue.

Once the issue is resolved all users are notified that the alert condition has been resolved. The determination of the closest user is one parameter, it is also an embodiment that a user who happens to be able to respond to the alert first is notified before the closest user. This may be achieved by a status indicator associated with each user. The status indicator can be modified based, at least in part, by user input indicating an activity level and time of availability of each user.

Some of the illustrative embodiments of the present disclosure may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other variations are possible within the teachings of the various embodiments. While the disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof.

One embodiment is directed to the system apparatus and methods described herein.

Another embodiment is directed to one or more adaptive basic clusters, which are shown as 504(a) ... (n) in combination with 505 or adaptive sub-cluster entities 504(a) ... (n), grouped to form one or more adaptive clusters, also referred to as adaptive higher order clusters, 502(a) ... (n). One or more adaptive basic cluster gateways 508 that are adapted to communicate via a first wireless communication having a defined data rate with one or more adaptive cluster gateways 508 and/or one or more adaptive higher order cluster gateways 506; where the one or more adaptive cluster gateways 508 communicate with one or more adaptive sub-cluster entities, generally 504, the adaptive cluster gateways 508 adapted to communicate via cellular, satellite or UHF, and one or more adaptive basic entities 504(a) ... (n) and 505, operatively coupled to an associated one or more of the adaptive basic clusters 504(a) ... (n), also referred to as adaptive sub-clusters 504(a) ... (n), each adaptive entity 502(a) ... (n) operatively coupled to one or more objects 722; where the one or more adaptive entities 502(a) ... (n) is configured to receive data from the one or more objects 722.

Another embodiment is directed to the apparatus as described above where the objects 722 include stationary articles.

Another embodiment is directed to the apparatus as described above where the objects 722(a) ... (n) include non-stationary articles.

Another embodiment is directed to the apparatus as described above where the objects 722 include a trough.

Another embodiment is directed to the apparatus as described above where the adaptive entities 504(a) ... (n) further comprises one or more objects 722(a) ... (n).

Another embodiment is directed to the apparatus as described where the object 722(a) ... (n) further comprises one or more sensors 724(a) ... (n), 725(a) ... (n).

Another embodiment is directed to the apparatus as described above where the sensor 724, 725 is capable of measuring and detecting physical quantity, condition or state associated with the object 722.

Another embodiment is directed to the apparatus described above where the adaptive sub-cluster entities 504(a) ... (n) includes sensors 724, 725 such as a pressure sensor.

Another embodiment is directed to the apparatus described above where the adaptive basic cluster gateway 508 is configured to receive signals from basic entities 504 and/or basic entity and router 505.

Another embodiment is directed to the apparatus described above where the adaptive basic entities 504(a) ... (n) comprises: an associated digital multiplexer 718 that provides a digital data stream to a transmitter unit 512 via a path having a specified rate low rate highly available radio transmitter unit; where the low rate highly available radio transmitter unit 512 transmits the data stream generated by the digital multiplexer 718 to a low rate highly available radio transmitter unit of the adaptive sub-cluster entity 504 or to another adaptive entity low rate highly available radio receiver unit 515 that is configured as an adaptive entity and router unit 505; where the adaptive entity and router unit 505 low rate highly available radio transmitter unit 525 is configured to receive its own entity digital data stream as well as the digital data stream from another adaptive entity 504 low rate highly available radio transmitter unit 512 and send a combined signal to the adaptive basic cluster gateway 508, adaptive sub-cluster entity 504 or adaptive higher order cluster gateway 506 low rate highly available radio receiver unit 515 based on predefined set of criteria.

Another embodiment is directed to the apparatus described above where the adaptive entity 504 comprises: object sensors 724, 725, object data processors 720, an adaptive entity data multiplexer 718; a low rate highly available radio transmitter 716 and one or more receiver units 512 being powered using harvested energy 714; where the harvested energy source 714 is selected from the following sources: solar, thermal, vibration and/or RF.

Another embodiment is directed to the apparatus described above where the adaptive cluster gateway 506 comprises: object sensors 724, object data processors 720, digital data multiplexer 832, low rate highly available radio receiver 515, alert request application unit 830, message gateway 828, and bi-directional data communication wireless modem 826; where the harvested energy source 714 is selected from the following sources: solar, thermal, vibration and/or RF.

Therefore, it is intended that the disclosure not be limited to the particular embodiment disclosed as the best or only mode contemplated for carrying out this invention, but that the disclosure will include all embodiments falling within the scope of the appended claims. Also, in the drawings and the description, there have been disclosed exemplary embodiments and, although specific terms may have been employed, they are unless otherwise stated used in a generic and descriptive sense only and not for purposes of limitation, the scope of the disclosure therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the disclosure should be determined by the appended claims and their legal equivalents, and not by the examples given.

The invention claimed is:

1. A method comprising:
   sensing first data at a first object including a sensor and a transmitter;
   sensing second data at a second object including a sensor, a receiver and a transmitter;
   when a visible transmission path exists between the first object and a gateway device:
      transmitting the first data from the first object to the gateway device;
   when the visible transmission path does not exist between the first object and the gateway device:
      transmitting the first data from the first object to the second object, and
      transmitting the first data and the second data from the second object to the gateway device; and
   transmitting the first data and the second data from the gateway device to a destination.

2. The method according to claim 1, where the destination includes a user interface.

3. The method according to claim 1, where the first object or the second object is a physical object.

4. The method according to claim 3, where the physical object is a feed trough, water trough, tractor, gate, barn door, fence or fence post.

5. The method according to claim 1, where the first object or the second object is a virtual object.

6. The method according to claim 1, further comprising transmitting, by the second object, a sequence of data based, at least in part, on priority.

7. A system comprising:
   a first object including a sensor configured to sense first data, and a transmitter configured to transmit the first data;
   a second object including a sensor configured to sense second data, a receiver configured to receive the first data, and a transmitter configured to transmit the first data and the second data; and
   a gateway including a receiver configured to receive the first data and the second data, and a transmitter configured to transmit the first data and the second data to a destination,
   where, when a visible transmission path exists between the first object and the gateway device, the first object is configured to transmit the first data to the gateway device, and
   where, when the visible transmission path does not exist between the first object and the gateway device, the first object is configured to transmit the first data to the second object, and the second object is configured to transmit the first data to the gateway.

8. A monitoring system comprising:
   a first plurality of objects, each of the first plurality of objects having one or more associated sensors, each sensor configured to generate sensed data signals for the object, each object of the first plurality of objects having an associated transmitter configured to transmit the sensed data signals to a gateway device when a visible transmission path exists between the object and the gateway device, and transmit the sensed data signals to one or more objects of a second plurality of objects when the visible transmission path does not exist between the object and the gateway device,
   each object of the second plurality of objects having one or more associated sensors, each sensor configured to generate sensed data signals for the object, each object of the second plurality of objects having an associated transmitter configured to transmit the sensed data signals to the gateway device and an associated receiver configured to receive sensed data signals from one or more of the first plurality of objects, and each object of the second plurality of objects configured to transmit the sensed data signals received from one or more of the first plurality of objects to the gateway device; and
   the gateway device operatively coupled to one or more objects of the first plurality of objects and one or more objects of the second plurality of objects, the gateway device configured to receive sensed data signals transmitted from one or more objects of the first plurality of objects when a visible transmission path exists between the gateway device and the one or more objects of the first plurality of objects, and the gateway device configured to receive sensed data signals originating from one or more objects of the first plurality of objects, via one or more objects of the second plurality of objects, when a visible transmission path does not exist between one or more objects of the first plurality of objects and the gateway device,
   the gateway device configured to transmit received sensed data signals to a destination.

9. The system of claim 8, where the destination includes a user interface.

10. The system of claim 8, where the object includes a feed trough, water trough, tractor, gate, barn door, fence or fence post.

11. The system of claim 8, where the object is a physical object.

12. The system of claim 8, where the object is a virtual object.

13. The system of claim 8, where the second plurality of objects provides a sequence of sensed data signal transmission based, at least in part, on a priority indicator of the sensed data signal.

* * * * *